(12) United States Patent
Shi et al.

(10) Patent No.: US 12,502,562 B2
(45) Date of Patent: Dec. 23, 2025

(54) HUMAN iPSC-DERIVED BRAIN ORGANOIDS AND USES THEREOF

(71) Applicant: CITY OF HOPE, Duarte, CA (US)

(72) Inventors: Yanhong Shi, Arcadia, CA (US); Guoqiang Sun, Diamond Bar, CA (US); Xianwei Chen, Arcadia, CA (US)

(73) Assignee: CITY OF HOPE, Duarte, CA (US)

( * ) Notice: Subject to any disclaimer, the term of this patent is extended or adjusted under 35 U.S.C. 154(b) by 1312 days.

(21) Appl. No.: 17/208,300

(22) Filed: Mar. 22, 2021

(65) Prior Publication Data
US 2021/0300998 A1 Sep. 30, 2021

Related U.S. Application Data

(60) Provisional application No. 62/993,517, filed on Mar. 23, 2020.

(51) Int. Cl.
| | |
|---|---|
| *C12N 15/113* | (2010.01) |
| *A61K 39/245* | (2006.01) |
| *A61P 31/22* | (2006.01) |
| *C07K 16/08* | (2006.01) |
| *C12N 5/00* | (2006.01) |

(52) U.S. Cl.
CPC .......... *C12N 15/113* (2013.01); *A61K 39/245* (2013.01); *A61P 31/22* (2018.01); *C07K 16/089* (2023.08); *C12N 5/0062* (2013.01)

(58) Field of Classification Search
None
See application file for complete search history.

(56) References Cited

PUBLICATIONS

Lee et al. J of Biomedical Science, vol. 24, p. 1-12 (Year: 2017).*
Maucksch et al., Stem Cells Translational Medicine, vol. 2, pp. 579-583 (Year: 2013).*
Andreoni, M., et al., "A Rapid Microbeutralization Assay for the Measurement of Neutralizing Antibody Reactive with Human Cytomegalovirus," J. Virol. Meth. 23:157-168 (1989).
Boppana, S. B., et al., "Antiviral Antibody Responses and Intrauterine Transmission After Primary Maternal Cytomegalovirus Infection," J. Infect. Dis. 171:1115-1121 (1995).
Boppana, S. B., et al., "Intrauterine Transmission of Cytomegalovirus to Infants of Women with Preconceptional Immunity," N. Engl. J. Med. 344(18 ):1366-1371 (2001).
Britt, W., "Manifestations of Human Cytomegalovirus Infection: Proposed Mechanisms of Acute and Chronic Disease," Curr. Top. Microbiol. Immunol. 325:417-470 (2008).
Britt, W. J., "Human Cytomegalovirus: Propagation, Quantification, and Storage," Curr. Protoc. Microbiol. 18:14E.3.1-14E.3.17 (2010).
Britt, W., J., "Congenital Human Cytomegalovirus Infection and the Enigma of Maternal Immunity," J. Virol. 91:e02392-16 (2017).
Brown, R. M., et al., "Human Cytomegalovirus Compromises Development of Cerebral Organoids," J. Virol. 93(17):e00957-19 (2019).
Cannon, M. J., et al., "Washing Our Hands of the Congenital Cytomegalovirus Disease Epidemic," BMC Public Health 5:70 (2005).
Chaanine, A. H., et al., "Potential Role of BNIP3 in Cardiac Remodeling, Myocardial Stiffness and Endoplasmic Reticulum-Mitochondrial Calcium Homeostasis in Diastolic and Systolic Heart Failure," Circ. Heart Fail. 6(3):572-583 (2013).
Cheeran, M. C.J., et al., "Neuropathogensis of Congenital Cytomegalovirus Infection: Disease Mechanisms and Prospects for Intervention," Clin. Microbiol. Rev. 22(1):99-126 (2009).
Cherrington, J. M., et al., "Human Cytomegalovirus ie1 Transactivates the α Promoter-Enhancer via an 18-Base-Pair Repeat Element," J. Virol. 63(3):1435-1440 (1989).
Chiuppesi, F. et al., "Vaccine-Derived Neutralizing Antibodies to the Human Cytomegalovirus gH/gL Pentamer Potently Block Primary Cytotrophoblast Infection," J. Virol. 89(23):11884-11898 (2015).
Ciferri, C., et al., "Structural and Biochemical Studies of HCMV gH/gL/gO and Pentamer Reveal Mutually Exclusive Cell Entry Complexes," PNAS 112(6):1767-1772 (2015).
Cugola, F. R., et al., "The Brazilian Zika Virus Strain Causes Birth Defects in Experimental Models," Nature 534(7606):267-271 (2016).
D'Aiuto, L., et al., "Human Induced Pluripotent Stem Cell-Derived Models to Investigate Human Cytomegalovirus Infection in Neural Cells," PLoS One 7(11):e49700 (2012).
Deng, R., et al., "Pharmacokinetics and Exposure-Response Analysis of RG7667, a Combination of Two Anticytomegalovirus Monoclonal Antibodies, in a Phase 2a Randomized Trial to Prevent Cytomegalovirus Infection in High-Risk Kidney Transplant Recipients," Antimicrobial Agents and Chemotherapy 62(2):e01108-17 (2018).
Di Lullo, E., et al., "The Use of Brain Organoids to Investigate Neural Development and Disease," Nat. Rev. Neurosci. 18(10):573-584 (2017).
Douvaras, P., et al., "Generation and Isolation of Oligodendrocyte Progenitor Cells from Human Pluripotent Stem Cells," Nat. Protoc. 10(8):1143-1154 (2015).
Falk, J. J., et al., "Generation of a Gaussia Luciferase-Expressing Endotheliotropic Cytomegalovirus for Screening Approaches and Mutant Analyses," J. Virol. Meth. 235:182-189 (2016).
Feire, A. L., et al., "Cellular Integrins Function as Entry Receptors for Human Cytomegalovirus via a Highly Conserved Disintegrin-Like Domain," PNAS 101(43):15470-15475 (2004).
Fox, E., et al., "Maternal and Fetal Anti-Brain Antibodies in Development and Disease," Dev. Neurobiol. 72(10):1327-1334 (2012).

(Continued)

*Primary Examiner* — Yonsoo Kim
(74) *Attorney, Agent, or Firm* — Perkins Coie LLP; Lara J. Dueppen

(57) ABSTRACT

Disclosed are methods of producing human iPSC-derived brain organoids and uses thereof to detect and develop treatment for HCMV-induced brain deformation in developing fetus.

4 Claims, 25 Drawing Sheets
(21 of 25 Drawing Sheet(s) Filed in Color)
Specification includes a Sequence Listing.

(56) References Cited

PUBLICATIONS

Gaspard, N., et al., "An Intrinsic Mechanism of Corticogenesis from Embryonic Stem Cells," Nature 455:351-357 (2008).
Gerna, G., et al., "The Pentameric Complex of Human Cytomegalovirus: Cell Tropism, Virus Dissemination, Immune Response and Vaccine Development," J. Gen. Virol. 98:2215-2234 (2017).
Hahn, G., et al., "Human Cytomegalovirus UL131-128 Genes Are Indispensable for Virus Growth in Endothelial Cells and Virus Transfer to Leukocytes," J. Virol. 78(18):10023-10033 (2004).
Ishida, J. H., et al., "Phase 1 Randomized, Double-Blind, Placebo-Controlled Study of RG7667, an Anticytomegalovirus Combination Monoclonal Antibody Therapy, in Healthy Adults," Antimicrobial Agents and Chemotherapy 59(8):4919-4929 (2015).
Kabanova, A., et al., "Antibody-Driven Design of a Human Cytomegalovirus gHgLpUL128L Subunit Vaccine that Selectively Elicits Potent Neutralizing Antibodies," PNAS 111(50):17965-17970 (2014).
Kabanova, A., et al., "Platelet-Derived Growth Factor-α Receptor is the Cellular Receptor for Human Cytomegalovirus gHgLgO Trimer," Nat. Microbiol. 1(8):16082 (2017).
Kawasaki, H., et al., "Pathogenesis of Developmental Anomalies of the Central Nervous System Induced by Congenital Cytomegalovirus Infection," Pathol. Int. 67:72-82 (2017).
Kelava, I., et al., "Dishing Out Mini-Brains: Current Progress and Future Prospects in Brain Organoid Research," Dev. Biol. 420:199-209 (2016).
Kenneson, A., et al., "Review and Meta-Analysis of the Epidemiology of Congenital Cytomegalovirus (CMV) Infection," Rev. Med. Virol. 17:253-276 (2007).
Kim, D., et al., "TopHat2: Accurate Alignment of Transcriptomes in the Presence of Insertions, Deletions and Gene Fusions," Genome Biol. 14:R36 (2013).
Kime, C., et al., "Practical Integration-Free Episomal Methods for Generating Human Induced Pluripotent Stem Cells," Hum. Genet. 87:21.2.1-21.2.21 (2015).
Kwak, M., et al., "Brain Magnetic Resonance Imaging Findings of Congenital Cytomegalovirus Infection as a Prognostic Factor for Neurological Outcome," Pediat. Neurol. 83:14-18 (2018).
Lancaster, M. A., et al., "Cerebral Organoids Model Human Brain Development and Microcephaly," Nature 501(7467):1-21 (2013).
Lancaster, M. A., et al., "Generation of Cerebral Organoids from Human Pluripotent Stem Cells," Nat. Protoc. 9(10):2329-2340 (2014).
Lancaster, M. A., et al., "Organogenesis in a Dish: Modeling Development and Disease Using Organoid Technologies," Science 345(6194):283 & 1247125-1-1247125-9 (2014).
Lanzieri, T. M., et al., "Systematic Review of the Birth Prevalence of Congenital Cytomegalovirus Infection in Developing Countries," Int J. Infect. Dis. 22:44-48 (2014).
Li, L., et al., "GFAP Mutations in Astrocytes Impair Oligodendrocyte Progenitor Proliferation and Myelination in a Human iPSC Model of Alexander Disease," Cell Stem Cell 23(2):239-251 (2018).
Li, W., et al., "Nuclear Receptor TLX Regulates Cell Cycle Progression in Neural Stem Cells of the Developing Brain," Mol. Endocrinol. 22:56-64 (2008).
Lilleri, D., et al., "Fetal Human Cytomegalovirus Transmission Correlates with Delayed Maternal Antibodies to gH/gL/pUL128-130-131 Complex during Primary Infection," PLoS One 8(3):e59863 (2013).
Lilleri, D., et al., "Antibodies Against Neutralization Epitopes of Human Cytomegalovirus gH/gL/pUL128-130-131 Complex and Virus Spreading May Correlate with Virus Control In Vivo," J. Clin. Immunol. 32:1324-1331 (2012).
Macagno, A., et al., "Isolation of Human Monoclonal Antibodies that Potently Neutralize Human Cytomegalovirus Infection by Targeting Different Epitopes on the gH/gL/UL128-131A Complex," J. Virol. 84(2):1005-1013 (2010).

Maidji, E., et al., "Maternal Antibodies Enhance or Prevent Cytomegalovirus Infection in the Placenta by Neonatal Fc Receptor-Mediated Transcytosis," Am. J. Pathol. 168(4):1210-1226 (2006).
Manicklal, S., et al., "The "Silent" Global Burden of Congenital Cytomegalovirus," Clin. Microbiol. Rev. 26(1):86-102 (2013).
Martinez-Martin, N., et al., "An Unbiased Screen for Human Cytomegalovirus Identifies Neuropilin-2 as a Central Viral Receptor," Cell 174:1158-1171 (2018).
Molyneaux, B. J., et al., "Neuronal Subtype Specification in the Cerebral Cortex," Nat. Rev. Neurosci. 8:427-437 (2007).
Mora-Bermudez, F., et al., "Differences and Similarities Between Human and Chimpanzee Neural Progenitors During Cerebral Cortex Development," eLife 5:e18683 (2016).
Murphy, E., et al., "Coding Potential of Laboratory and Clinical Strains of Human Cytomegalovirus," PNAS 100(25):14976-14981 (2003).
Nelson, C. S., et al., "Preexisting Antibodies Can Protect Against Congenital Cytomegalovirus Infection in Monkeys," JCI Insight 2(13):e94002 (2017).
Nigro, G., et al., "Passive Immunization During Pregnancy for Congenital Cytomegalovirus Infection," N. Engl. J. Med. 353:1350-1362 (2005).
Niwa, H., et al., "Eficient Selection for High-Expression Transfectants with a Novel Eukaryotic Vector," Gene 108:193-200 (1991).
O'Connor, C. M., et al., "A Myeloid Progenitor Cell Line Capable of Supporting Human Cytomegalovirus Latency and Reactivation, Resulting in Infectious Progeny," J. Virol. 86(18):9854-9865 (2012).
Palmeira, P., et al., "IgG Placental Transfer in Healthy and Pathological Pregnancies," Clin. Dev. Immunol. 985646:1-13 (2012).
Petersen, L. R., et al., "Zika Virus," N. Engl. J. Med. 374:1552-1563 (2016).
Qian, X., et al., "Brain Region-Specific Organoids Using Mini-Bioreactors for Modeling ZIKV Exposure," Cell 165(5):1238-1254 (2016).
Qin, J., et al., "Fluoride Inhibition of Enolase: Crystal Structure and Thermodynamics," Biochem. 45(3):793-800 (2006).
Revello, M. G., et al., "A Randomized Trial of Hyperimmune Globulin to Prevent Congenital Cytomegalovirus," N. Engl. J. Med. 370:1316-1326 (2014).
Ryckman, B. J., et al., "Characterization of the Human Cytomegalovirus gH/gL/UL128-131 Complex That Mediates Entry into Epithelial and Endothelial Cells," J. Virol. 82(1):60-70 (2008).
Ryckman, B. J., et al., "HCMV gH/gL/UL128-131 Interferes with Virus Entry into Epithelial Cells: Evidence for Cell Type-Specific Receptors," PNAS 105(37):14118-14123 (2008).
Saunders, N. R., et al., "Barrier Mechanisms in the Developing Brain," Front. Pharmacol. 3(46):1-18 (2012).
Shumilina, E., et al., "Phosphoinositide-Dependent Kinase PDK1 in the Regulation of $CA^{2+}$ Entry into Mast Cells," Cell Physiol. Biochem. 26:699-706 (2010).
Sison, S. L., et al., "Human Cytomegalovirus Disruption of Calcium Signaling in Neural Progenitor Cells and Organoids," J. Virol. 93(17):1-23 (2019).
Soroceanu, L., et al., "Platelet-Derived Growth Factor-α Receptor Activation is Required for Human Cytomegalovirus Infection," Nature 455:391-396 (2008).
Taverna, E., et al., "The Cell Biology of Neurogenesis: Toward an Understanding of the Development and Evolution of the Neocortex," Annu. Rev. Cell Dev. Biol. 30:465-502 (2014).
Teissier, N., et al., "Cytomegalovirus-Induced Brain Malformations in Fetuses," J. Neuropathol. Exp. Neurol. 73(2):143-158 (2014).
Turrigiano, G. G., et al., "Activity-Dependent Scaling of Quantal Amplitude in Neocortical Neurons," Nature 391:892-896 (1998).
Vanarsdall, A. L., et al., "HCMV Trimer- and Pentamer-Specific Antibodies Synergize for Virus Neutralization but do not Correlate with Congenital Transmission," PNAS 116(9):3728-3733 (2019).
Wang, C., et al., "Attribution of Congenital Cytomegalovirus Infection to Primary Versus Non-Primary Maternal Infection," Clin. Infect. Dis. 52(2):e11-e13 (2011).
Wang, D., et al., "Human Cytomegalovirus Virion Protein Complex Required for Epithelial and Endothelial Cell Tropism," PNAS 102(50):18153-18158 (2005).

(56) References Cited

PUBLICATIONS

Wang, X., et al., "Epidermal Growth Factor Receptor is a Cellular Receptor for Human Cytomegalovirus," Nature 424:456-461 (2003).
Wu, Y., et al., "Human Cytomegalovirus Glycoprotein Complex gH/gL/gO Uses PDGFR-α as a Key for Entry," PLoS Pathog. 13(4):e1006281 (2017).
Wussow, F., et al., "Human Cytomegalovirus Vaccine Based on the Envelope gH/gL Pentamer Complex," PLoS Pathog. 10(11):e1004524 (2014).
Wussow, F., et al., "Neutralization of Human Cytomegalovirus Entry into Fibroblasts and Epithelial Cells," Vaccines 5:39 (2017).
Zydek, M., et al., "HCMV Infection of Human Trophoblast Progenitor Cells of the Placenta Is Neutralized by a Human Monoclonal Antibody to Glycoprotein B and Not by Antibodies to the Pentamer Complex," Viruses 6:1346-1364 (2014).

* cited by examiner

FIG. 1D  FIG. 1E
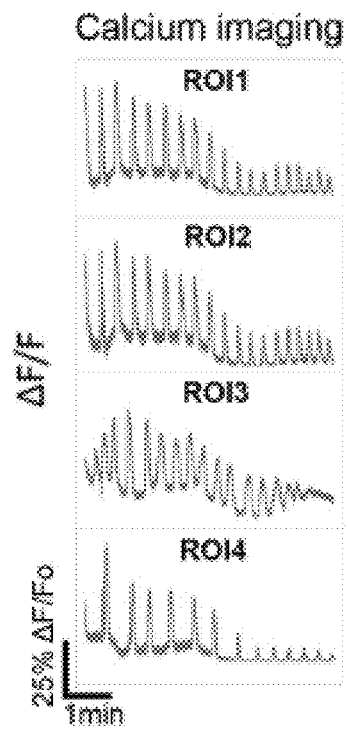
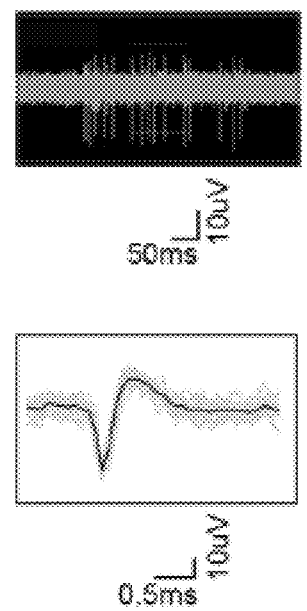
FIG. 1F
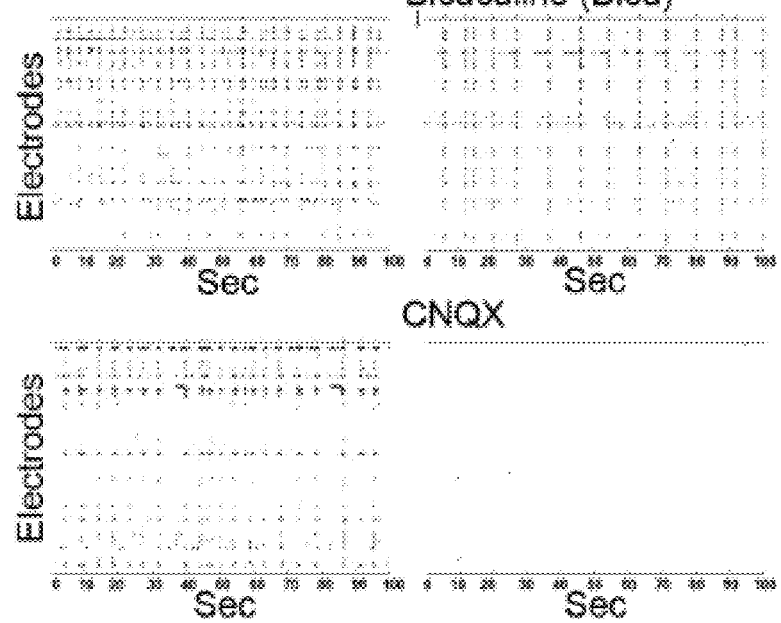

GFP-tagged HCMV TB40/E non-GFP HCMV TB40/E-Gluc

FIG. 8A          FIG. 8B
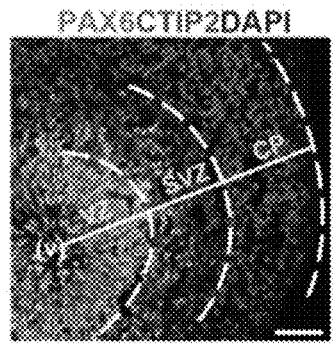 
FIG. 8C
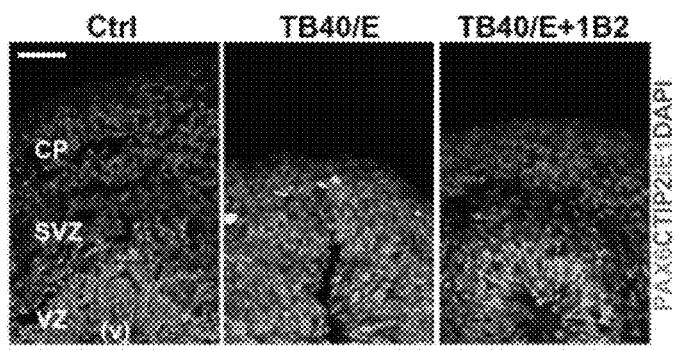
FIG. 8D
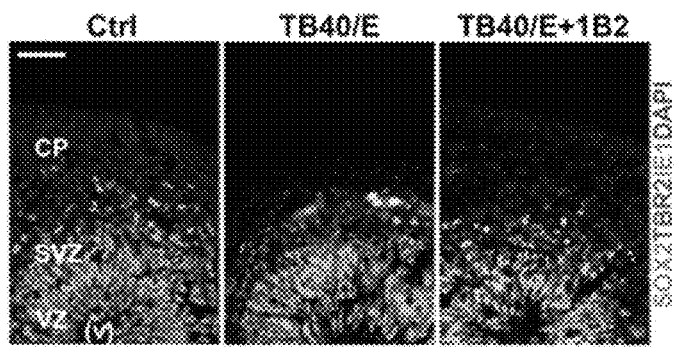

FIG. 8E
FIG. 8F
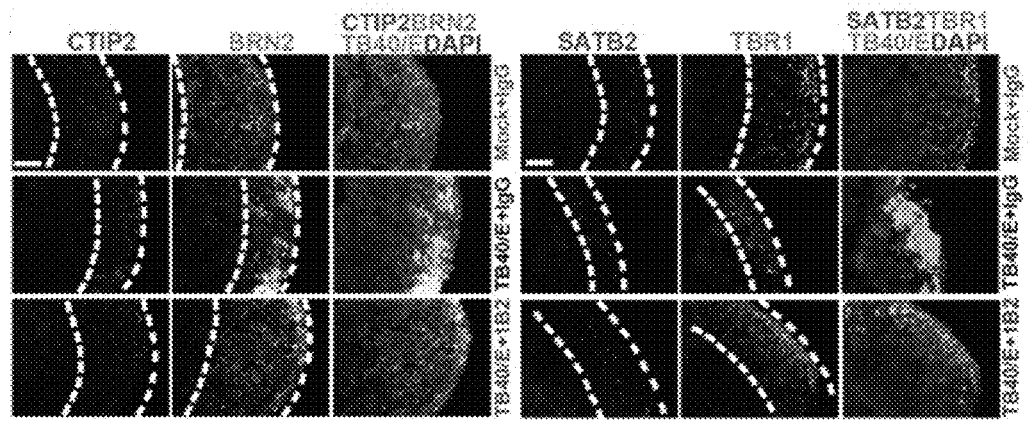
FIG. 8G
FIG. 8H
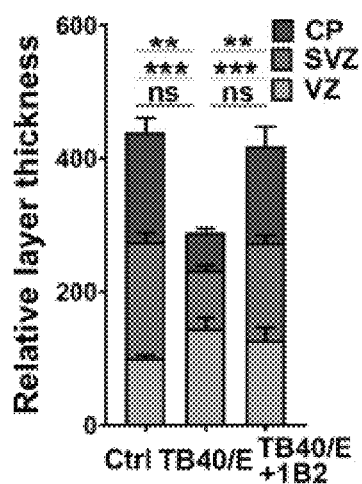
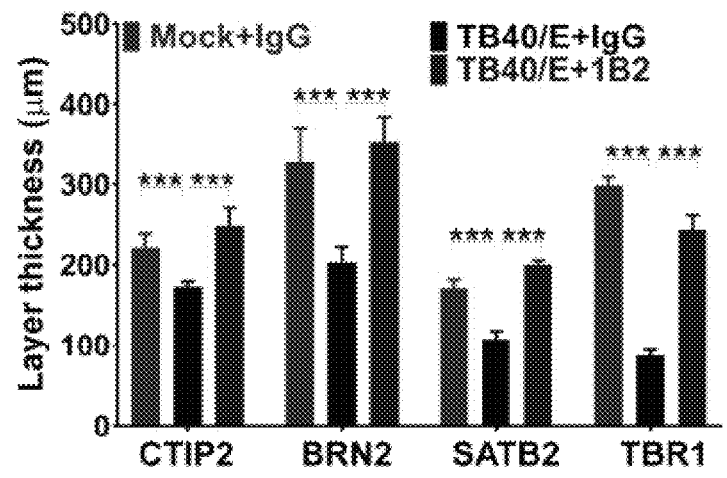

FIG. 11B
FIG. 11C
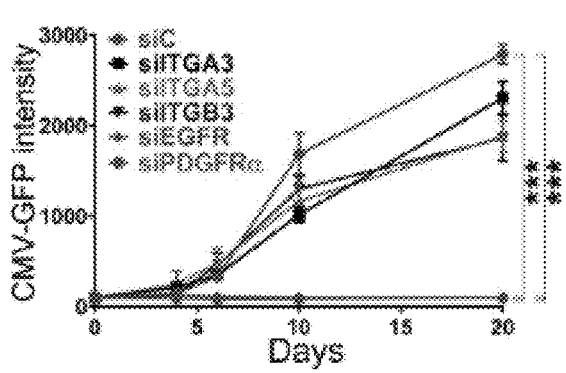
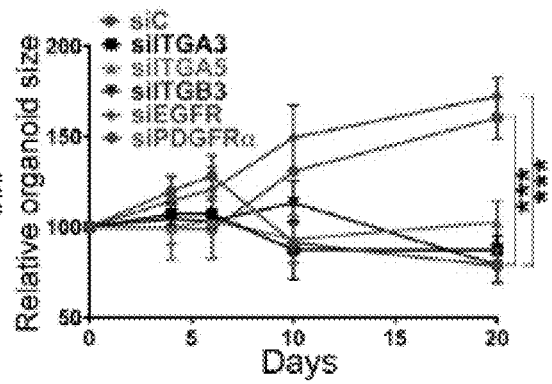
FIG. 11D
FIG. 11E
FIG. 11F
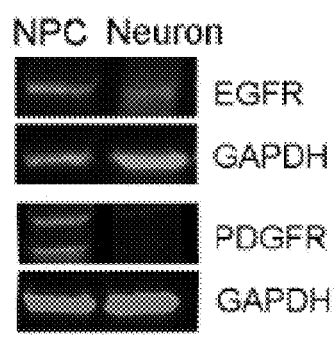
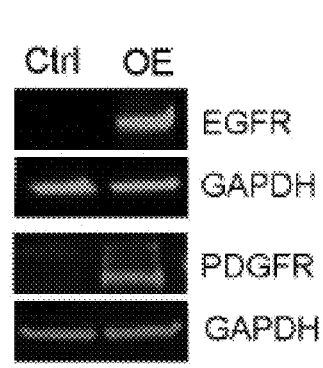
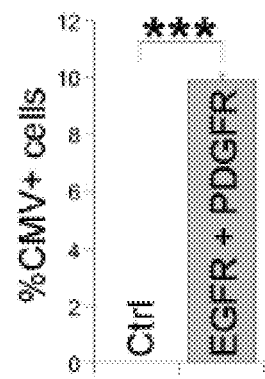

HUMAN iPSC-DERIVED BRAIN ORGANOIDS AND USES THEREOF

PRIORITY CLAIM

This application claims priority to U.S. Provisional Patent Application No. 62/993,517, filed Mar. 23, 2020, which hereby is incorporated by reference in its entirety, including drawings.

STATEMENT REGARDING FEDERALLY SPONSORED RESEARCH OR DEVELOPMENT

This invention was made with government support under Grant Numbers AG056305, AG061794 and AG061710, awarded by the National Institutes of Health. The government has certain rights in the invention.

SEQUENCE LISTING

This application contains a Sequence Listing, which was submitted in ASCII format via EFS-Web, and is hereby incorporated by reference in its entirety. The ASCII copy, created on Mar. 16, 2021, is named SequenceListing.txt and is 3 KB in size.

BACKGROUND

Human cytomegalovirus (HCMV) is a ubiquitous and highly-adapted human pathogen that establishes lifelong latency in infected individuals. While it is usually benign, HCMV infection during pregnancy can result in viral transmission to the developing fetus, thereby causing irreparable birth defects in newborns[1,2]. Congenital HCMV infection can occur following primary maternal infection, or result from non-primary maternal infection due to maternal re-infection or viral reactivation[3,4]. It is estimated that 0.5-2% of all newborns worldwide are affected by congenital HCMV infection[5,6]. Around 10-15% of congenitally infected newborns are symptomatic at birth, and these infants may suffer from neurodevelopmental deficits, including hearing loss, mental retardation, microcephaly, or cerebral palsy[2,7,8]. In addition, congenitally infected newborns that are asymptomatic at birth may develop neurological illness later in life[2,7]. In the United States, children with long-term medical conditions are estimated to be more frequently associated with congenital HCMV infection than with other well-known childhood diseases, such as Down syndrome, fetal alcohol syndrome, and spina bifida[9].

Despite the recognition of congenital HCMV infection as a leading cause of neurological defects in newborns, HCMV-induced neuropathogenesis remains poorly understood[2]. While studies with mouse and rhesus CMV in their respective animal models have been used to gain insights into HCMV-induced brain malformation[2,10] these surrogate animal models may not faithfully address the neuropathology of HCMV. The strict CMV species specificity limits studies of HCMV infection to in vitro cell culture system and excludes the use of animals to directly investigate HCMV-specific brain disorders or to identify antiviral strategies that could mitigate neurological defects specifically associated with HCMV infection[2]. Therefore, there is a need to develop effective diagnostic tools and prophylactic and therapeutic agents for HCMV infections, in particular, congenital HCMV infections causing neurodevelopmental deficits.

SUMMARY

In one aspect, this disclosure relates to a method of treating or preventing a neurodevelopmental deficit or HCMV-induced brain malformation in a developing fetus, wherein the mother is infected by HCMV or at an elevated risk of HCMV infection. The method entails administering to the mother carrying the fetus a therapeutically effective amount of one or more neutralizing antibodies that target HCMV pentamer complex or gH, or a vaccine capable of eliciting neutralizing antibodies and comprising the HCMV pentamer complex or gH, wherein the HCMV pentamer complex comprises gH, gL, UL128, UL130, and UL131A. In certain embodiments, the developing fetus is at the transition between the first and second trimester of gestation. In certain embodiments, the neutralizing antibodies include 1B2 and 62-11. In certain embodiments, the neutralizing antibody is a monoclonal antibody. In certain embodiments, the neutralizing antibody is a human antibody or a humanized antibody. In certain embodiments, the neutralizing antibody is a recombinant antibody. In certain embodiments, the neutralizing antibody or the vaccine is administered by oral administration or intravenous injection. In certain embodiments, the neutralizing antibody is conjugated to a delivery carrier such as nanoparticles, liposomes, polymersomes, and viral envelope proteins.

In another aspect, this disclosure relates to a method of treating or preventing a neurodevelopmental deficit or HCMV-induced brain malformation in a developing fetus, wherein the mother is infected by HCMV or at an elevated risk of HCMV infection. The method entails administering to the mother carrying the fetus a therapeutically effective amount of a platelet-derived growth factor receptor alpha (PDGFRα) inhibitor, an epidermal growth factor receptor (EGFR) inhibitor, or both. In certain embodiments, the PDGFRα inhibitor is an siRNA specific for the PDFGRα. In certain embodiments, the EGFR inhibitor is an siRNA specific for the EGFR. In certain embodiments, the PDGFRα or EGFR is knocked out by CRISPR or CRISPR-mediated inhibition. In certain embodiments, the developing fetus is at the transition between the first and second trimester of gestation.

In a related aspect, this disclosure relates to a combinational therapy for treating or preventing a neurodevelopmental deficit or HCMV-induced brain malformation in a developing fetus, wherein the mother is infected by HCMV or at an elevated risk of HCMV infection. The combinational therapy includes administering to the mother carrying the fetus two or more of (i) one or more neutralizing antibodies that target HCMV pentamer complex, (ii) one or more neutralizing antibodies that target HCMV gH, (iii) a vaccine comprising HCMV gH and capable of eliciting neutralizing antibodies, (iv) a vaccine comprising HCMV pentamer complex and capable of eliciting neutralizing antibodies, (v) one or more PDGFRα inhibitors, and (vi) one or more EGFR inhibitors. In certain embodiments, the HCMV pentamer complex comprises gH, gL, UL128, UL130, and UL131A. In certain embodiments, the PDGFRα inhibitor is an siRNA specific for the PDFGRα. In certain embodiments, the EGFR inhibitor is an siRNA specific for the EGFR.

In another aspect, this disclosure relates to an hiPSC-derived brain organoid comprising a layered structure which comprises a core region positive for the neural progenitor markers SOX2 and TLX, a deep layer positive for CTIP2, an outer layer positive for BRN2, a late-born superficial layer neuronal marker, and MAP2. In certain embodiments, the brain organoid further comprises PAX6-positive apical progenitors, and TBR2-positive basal progenitors. In certain embodiments, the brain organoid comprises SOX2-positive progenitors spanning across the ventricular zone and the subventricular zone. In certain embodiments, the brain organoid shows SOX2+ in the ventricle zone, TBR2+ in the subventricular zone, and CTIP2+ in the cortical plate. In certain embodiments, the brain organoid represents initiation of development of frontal cortex.

In another aspect, this disclosure relates to a method of producing an hiPSC-derived brain organoid. The method entails culturing human iPSCs in E8 medium to form embryoid bodies, culturing the embryoid bodies in a neural induction medium to induce primitive neuroepithelia, embedding the primitive neuroepithelia in Matrigel to obtain brain organoids, and culturing the brain organoids in a differentiation medium until day 45-75 from the starting day of culturing. In certain embodiments, the brain organoids are cultured in the differentiation medium for about 30-60 days or until the brain organoids show SOX2+ in the ventricle zone, TBR2+ in the subventricular zone, and CTIP2+ in the cortical plate. This disclosure also relates to an hiPSC-derived brain organoid produced by the method disclosed herein.

In yet another aspect, disclosed herein is a method of screening for a potential therapeutic agent for a neurodevelopmental deficit or HCMV-induced brain malformation in a developing fetus. The method entails contacting the iPSC-derived brain organoid infected with an HCMV strain in vitro or ex vivo with the potential therapeutic agent, and monitoring the growth of the brain organoid, wherein improved growth of the brain organoid relative to a brain organoid without treatment with the potential therapeutic agent indicating that the potential therapeutic agent is effective.

BRIEF DESCRIPTION OF THE DRAWINGS

This application contains at least one drawing executed in color. Copies of this application with color drawing(s) will be provided by the Office upon request and payment of the necessary fees.

FIGS. 1A-1F show generation of hiPSC-derived brain organoids. FIG. 1A: A schematic illustration of brain organoid derivation from hiPSCs. FIGS. 1B and 1C: Characterization of brain organoids by marker staining. Immunostaining hiPSC-derived brain organoids at day 45 (1B) and day 75 (1C) of differentiation for the neural progenitor markers SOX2 and TLX (1B), PAX6, SOX2 and TBR2 (1C), and the neuronal markers BRN2 and MAP2 (1B) and CTIP2 (1C). The merged images include DAPI staining (blue). V: ventricle; VZ the ventricle zone; SVZ the subventricular zone; and CP: the cortical plate. Scale bar: 100 µm. FIG. 1D: Calcium imaging of brain organoids at day 45 of differentiation. Single cell tracing of calcium surge upon glutamate stimulation in selected regions of interest (ROI) is shown. The change in fluorescence intensity (arbitrary units) of the calcium dye was plotted over time. FIG. 1E: Voltage waveforms of brain organoids. Spontaneous activity recorded from a single electrode of MEA for six seconds in a brain organoid at 75 days of differentiation (top panel). The waveform of all detected spikes from top panel is shown in grey and the mean waveform is shown in black (bottom panel). FIG. 1F: MEA recording of brain organoids. Graphs showing a representative MEA recording generated from the raw data of a spike raster plot, using the number of spikes recorded over 100 seconds. The top panels show MEA recording of hiPSC-derived brain organoids before (left panel) or after (right panel) treatment with the GABAergic neuronal inhibitor bicuculline. The bottom panels show MEA recording of hiPSC-derived brain organoid before (left panel) or after (right panel) treatment with the glutamatergic neuronal inhibitor CNQX. (See also FIG. 2).

FIG. 3A: ARPE-19 epithelial cells and MRC-5 fibroblasts were seeded in 96-well plates and either mock-infected or infected with TB40/E or Towne. HCMV-infected cells were immunostained for HCMV IE1 at 24 hours post infection. Shown are representative images of the IE1 immunostaining. Scale bar: 500 µm. FIGS. 3B-3E: Quantification of the number of proliferating and apoptotic cells in brain organoids infected with the GFP-tagged HCMV TB40/E (3B and 3C) or the non-GFP tagged HCMV TB40/E-Gluc (3D and 3E) in comparison to mock-infected brain organoid controls. The number of proliferating cells was evaluated by the percent of BrdU+ cells out of total cells, while apoptosis was assessed by the percent of active caspase 3-positive (Active Cas3+) cells out of total cells. Bars represent mean±SD. $p<0.01$ and *$p<0.001$ by Student's t-test. n=4 replicates.

FIGS. 4A-4C: Inhibition of brain organoid growth by HCMV TB40/E. hiPSC-derived brain organoids at day 45 of differentiation were infected with GFP-labeled TB40/E or Towne. Mock-infected brain organoids were used as a control. Immunofluorescence images of the mock-infected (Ctrl) and TB40/E- or Towne-infected brain organoids at the designated days post infection are shown in panel A. Scale bar, 200 µm. Graphs indicating the relative GFP fluorescence intensity (arbitrary units) or relative organoid size in HCMV-infected brain organoids versus mock-infected control brain organoids are shown in panels 4B and 4C. Growth kinetics were measured using relative organoid size. The relative organoid size for each time point is given as the % of day 0 organoid size in diameter (100%). FIG. 4D: Impaired layer structure in TB40/E-infected brain organoids. Brain organoids were mock-infected (Ctrl) or infected with TB40/E at day 30 of differentiation, and then stained for the neural progenitor marker SOX2 or the neuronal marker TUJ1 at day 15 post-infection (day 45 of differentiation). Scale bar, 20 µm. FIGS. 4E, 4F: Decreased cell proliferation and increased apoptosis in TB40/E-infected brain organoids. Brain organoids were infected with TB40/E at day 45 of differentiation. Brain organoids were mock-infected (Ctrl) or infected with TB40/E at day 30 of differentiation. The number of proliferating and apoptotic cells was determined by BrdU labeling (4E) or immunostaining for active Caspase 3 (Cas3) (4F). HCMV-infected cells were labeled by staining for HCMV IE1. Scale bar, 50 µm. For panels 4B & 4C, values represent mean±SD. *** $p<0.001$ by two-way ANOVA followed by Tukey's multiple comparison test. n=4 organoids per group. (See also FIG. 3).

FIG. 5A: Representative images of control organoids and brain organoids infected with TB40/E in the presence of different concentrations of 11B2 antibody. Scale bar, 200 μm. FIGS. 5B and 5C: Graphs illustrating the CMV-GFP fluorescence intensity (5B) and growth kinetics (5C) of control organoids and organoids infected with TB40/E in the presence of different concentrations of NAb 1B2. Growth kinetics was measured using relative organoid size. The relative organoid size for each time point is given as the % of the organoid size (100%) at day 0 of infection. Values represent mean±SD. * $p<0.001$ by two-way ANOVA followed by Tukey's multiple comparison test. n=4 organoids per group. (See also FIGS. 6 and 7**).

FIG. 6A: Representative images of control organoids and brain organoids infected with TB40/E in the presence of different concentrations of NAb 62-11. The images of the control organoids are the same as that in FIG. 5 because the experiments in FIG. 5 and FIG. 6 were performed in parallel. Scale bar, 200 μm. FIGS. 6B and 6C: Graphs illustrating the HCMV-GFP fluorescence intensity (6B) and growth kinetics (6C) of control organoids and TB40/E-infected brain organoids treated with NAb 62-11. Growth kinetics is measured using relative organoid size. The relative organoid size for each time point is given as the % of the organoid size (100%) at day 0 of infection. Values represent mean±SD. *** $p<0.001$ by two-way ANOVA followed by Tukey's multiple comparison test. n=4 organoids per group.

FIG. 7A: Representative images of brain organoids that were mock-infected or infected with TB40/E in the presence of IgG (Mock+IgG, or TB40/E+IgG) or brain organoids infected with TB40/E in the presence of NAb 1B2 (TB40/E+1B2) at the given time points during 30 days post infection. Scale bar, 200 μm. FIGS. 7B and 7C: Graphs indicating the relative GFP fluorescence intensity (arbitrary units) (7B) or relative organoid size (7C) in mock-infected control brain organoids, or brain organoids infected with TB40/E in the absence or presence of NAb 1B2. FIGS. 7D and 7E: Graphs indicating the relative GFP fluorescence intensity (arbitrary units) (7D) or relative organoid size (7E) in mock-infected control brain organoids, or brain organoids infected with TR in the absence or presence of NAb 1B2. The relative organoid size for each time point is given as the % of the organoid size (100%) at day 0 of infection. Values represent mean±SD. *** $p<0.001$ by two-way ANOVA followed by Tukey's multiple comparison test. n=4 replicates.

FIGS. 8A-8H show NAb-mediated prevention of TB40/E-induced abnormal brain organoid structure. FIG. 8A: A representative image showing layer specification of the VZ, SVZ and CP in brain organoids at day 75 of differentiation. FIG. 8B: An orthogonal view of HCMV-infected brain organoids stained for the HCMV IE1 and the progenitor markers SOX2 and TBR2. FIGS. 8C and 8D: Representative images of brain organoids stained for the progenitor markers PAX6 (8C), SOX2 and TBR2 (8D), the neuronal marker CTIP2, and HCMV IE1. Brain organoids were mock-infected or infected with TB40/E in the presence of IgG control antibody as organoid controls, or infected with TB40/E in the presence NAb 1B2 (2000 ng/ml). FIGS. 8E and 8F: Representative images of brain organoids stained for different neuronal markers. Control brain organoid and brain organoids infected with TB40/E in the presence of NAb 1B2 were stained for the cortical neuronal markers CTIP2 and BRN2 (8E), SATB2 and TBR1 (8F) at day 30 post-infection. FIG. 8G: Graph comparing the relative layer thicknesses (%) of the VZ, SVZ, and CP in control organoids and brain organoids infected with TB40/E in the presence of 1B2 antibody. The relative thickness is normalized to Ctrl VZ. FIG. 8H: Graph comparing the layer thicknesses of the CTIP2, BRN2, SATB2 or TBR1-positive layers in control organoids and brain organoids treated with TB40/E in the presence of 1B2 antibody. Scale bar, 50 μm for panels 8A to 8D, 100 μm for panels 8E and 8F. Values represent mean±SD.  $p<0.01$, * $p<0.001$ by ANOVA followed by Tukey's multiple comparison test. n=4 organoids per group. (See also FIG. 9).

FIGS. 9A and 9B: Representative images (cropped from images in FIGS. 8C, 8D) were used for counting specific layer marker-positive cells. Scale bar, 20 μm. FIG. 9C: Quantification of PAX6+, TBR2+, and CTIP2+ cells in brain organoids that were mock-infected in the presence of IgG control or infected with TB40/E in the presence of IgG control or NAb 1B2, in images shown in panels 9A and 9B. $p>0.05$ (ns),  $p<0.01$ by one-way ANOVA followed by Tukey's multiple comparison test. n=4 replicates. FIG. 9D: Quantification of PAX6+, TBR2+, and CTIP2+ cells in mock-infected control organoids and brain organoids infected with non-GFP-tagged TB40/E-Gluc or TR. $p>0.05$ (ns),  $p<0.01$, * $p<0.001$ by Student's t-test. n=4 replicates. For panels 9C & 9D**, values represent mean±SD.

FIG. 10A: Evaluation of siRNA efficacy. hiPSC-derived NPCs were transfected with siRNAs specific for PDGFRα, EGFR, ITGA5, ITGB3, ITGA3, or non-targeting control siRNA (siC). At four days post transfection, mRNA expression of specific genes was analyzed by RT-qPCR. Values represent mean±SD. * $p<0.001$ by Student's t-test. n=4 replicates. FIG. 10B**: siRNA-mediated inhibition of HCMV infection of fibroblast and epithelial cells. ARPE-19 and MRC-5 cells were treated with the receptor-specific siRNAs or siC. Following 48-hour incubation, cells were infected with TB40/E or Towne and stained for HCMV IE1 at 24 hours post-infection. The percent of HCMV-infected cells was calculated relative to the number of IE1-positive cells in HCMV-infected cells treated with siC. Values represent mean±SEM of three independent experiments performed in triplicate wells. Statistical significance was calculated to HCMV/siCTRL group using 2-way ANOVA followed by Dunnett's multiple comparisons test. * $p<0.05$,  $p<0.01$, * $p<0.001$, and **** $p<0.0001$. n=3 replicates.

FIGS. 11A-11F show that EGFR and PDGFRα are involved in TB40/E infection of brain organoids. hiPSC-derived brain organoids at day 45 of differentiation were treated with siRNAs specific for EGFR, PDGFRα, intergrin α3, α5, or β3, or control siRNA for 4 days and subsequently infected with GFP-labeled TB40/E. FIG. 11A: Immunofluorescence images of TB40/E-infected brain organoids pretreated with different siRNAs. Scale bar: 500 µm. FIGS. 11B and 11C: Graphs illustrating the HCMV GFP fluorescence intensity (11B) and brain organoid growth kinetics (11C). The relative organoid sizes for each time point are given as the % of the organoid size (100%) at day 0 of infection. Values represent mean±SD. *p<0.001 by two-way ANOVA followed by Tukey's multiple comparison test. n=4 organoids per group. FIG. 11D: Western blot analysis of the expression of EGFR and PDGFRα in human iPSC-derived NPCs and neurons. GAPDH was included as a loading control. FIG. 11E: Western blot analysis showing overexpression (OE) of EGFR and PDGFRα in HEK293T cells. GAPDH was included as a loading control. FIG. 11F: Overexpression of EGFR and PDGFRα renders hiPSCs susceptible to HCMV infection. hiPSCs were electroporated with a control vector expressing RFP or the combination of vectors expressing RFP together with EGFR and PDGFRα, and subsequently infected with HCMV TB40/E. The HCMV-infected cells were stained by the HCMV marker IE1. The percent of HCMV-positive cells was quantified by the percent of CMV IE1-positive (CMV+) cells out of total cells. Values represent mean±SD. *p<0.001 by Student's t-test. n=4 replicates. (See also FIG. 10).

FIG. 12A: Heatmap summary of changes in mRNA expression levels in TB40/E-infected brain organoids versus UV-irradiated TB40/E infected control brain organoids (Ctrl). FIG. 12B: GO analysis of down- and up-regulated genes in TB40/E-infected brain organoids, compared control organoids, ranked by −log 10 (p value). FIG. 12C: RT-qPCR analysis of selected down-regulated genes, ENO2, BNIP3, and PDK1, in TB40/E-infected brain organoids. Values represent mean±SD. *p<0.05, p<0.01, and *p<0.001 by Student's t-test. n=4 replicates.

FIGS. 13A and 13B: Calcium imaging of HCMV-infected brain organoids. Brain organoids at day 45 of differentiation were infected with HCMV TB40/E (without GFP reporter) in the presence of IgG control antibody or NAb 1B2 and analyzed by calcium imaging 4 days post infection. Brain organoids infected with UV-irradiated TB40/E (mock-infected) in the presence of IgG control antibody were included as a control. FIG. 13A: Representative images of HCMV IE1 immunostaining (red) are shown at the top panel and $Ca^{2+}$ dye fluorescence (green) are shown at the bottom panel. Scale bar: 200 µm. FIG. 13B: Four regions of interest (ROI) were selected and the $Ca^{2+}$ dye fluorescence intensity graph of the ROIs is shown. FIG. 13C: MEA analysis of HCMV-infected brain organoids. Brain organoids at day 45 of differentiation were infected with TB40/E in the presence of IgG control antibody or NAb 1B2 and MEA recording was performed 2 weeks post infection. Brain organoids infected with UV-irradiated TB40/E (mock-infected) in the presence of IgG control were used as a control. Graphs illustrate MEA recording generated from the raw data of a spike raster plot, using the number of spikes recorded over 100 seconds. FIG. 13D: Quantification of the MEA parameters measured in panel 13C. Values represent mean±SD. ***p<0.001 by Student's t-test. n=3 independent wells in MEA plates. (See also FIG. 14).

DETAILED DESCRIPTION

Figure 1A:
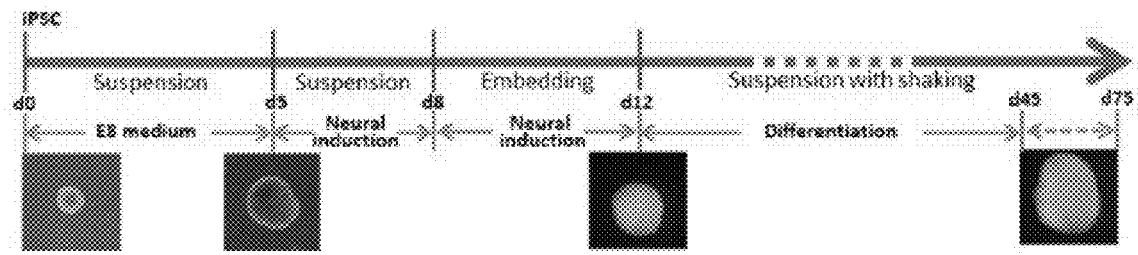

Disclosed herein are methods of treating or preventing a neurodevelopmental deficit in a developing fetus, wherein the mother carrying the fetus is infected by HCMV or at an elevated risk of HCMV infection. The methods entail administering to the mother a therapeutically effective amount of one or more of the following: (i) one or more neutralizing antibodies that target HCMV pentamer complex, (ii) one or more neutralizing antibodies that target HCMV gH, (iii) a vaccine comprising HCMV gH and capable of eliciting neutralizing antibodies, (iv) a vaccine comprising HCMV pentamer complex and capable of eliciting neutralizing antibodies, (v) one or more PDGFRα inhibitors, and (vi) one or more EGFR inhibitors.

The term "effective amount" as used herein refers to an amount of a composition that produces a desired effect. For example, the brain organoids may be infected with an effective amount of a therapeutic agent to study its effect in vitro (e.g., cell culture) or to produce a desired therapeutic effect ex vivo or in vitro. An effective amount of a composition, an antibody or a vaccine may be used to produce a therapeutic effect in a subject, such as preventing or treating a target condition, alleviating symptoms associated with the condition, or producing a desired physiological effect. In such a case, the effective amount of a composition, an antibody or a vaccine is a "therapeutically effective amount," "therapeutically effective concentration" or "therapeutically effective dose." The precise effective amount or therapeutically effective amount is an amount of the composition, antibody or vaccine that will yield the most effective results in terms of efficacy of treatment in a given subject or population of cells. This amount will vary depending upon a variety of factors, including but not limited to the characteristics of the composition (including activity, pharmacokinetics, pharmacodynamics, and bioavailability), the physiological condition of the subject (including age, sex, disease type and stage, general physical condition, responsiveness to a given dosage, and type of medication) or cells, the nature of the pharmaceutically acceptable carrier or carriers in the formulation, and the route of administration. Further, an effective or therapeutically effective amount may vary depending on whether the composition, antibody or vaccine is administered alone or in combination with another composition, drug, therapy or other therapeutic method or modality. One skilled in the clinical and pharmacological arts will be able to determine an effective amount or therapeutically effective amount through routine experimentation, namely by monitoring the brain organoid or subject's response to administration of a composition, antibody or vaccine and adjusting the dosage accordingly. For additional guidance, see Remington: The Science and Practice of Pharmacy, 21$^{st}$ Edition, Univ. of Sciences in Philadelphia (USIP), Lippincott Williams & Wilkins, Philadelphia, PA, 2005, which is hereby incorporated by reference as if fully set forth herein.

"Treating" or "treatment" of a condition may refer to preventing the condition, slowing the onset or rate of development of the condition, reducing the risk of developing the condition, preventing or delaying the development of symptoms associated with the condition, reducing or ending symptoms associated with the condition, generating a complete or partial regression of the condition, or some combination thereof. Treatment may also mean a prophylactic or preventative treatment of a condition.

In some embodiments, the antibody, vaccine or other therapeutic agents described herein may be administered by injection, nasal or respiratory inhalation, or by intravascular (i.v.) (e.g., intra-arterial, intravenous, and portal venous), subcutaneous (s.c.), intracutaneously (i.e.), intradermal (i.d.), or intraperitoneal (i.p.) administration. The antibody, vaccine or other therapeutic agents may be administered more than once.

One of the main limitations in modeling HCMV-induced neurodevelopmental disorders is the lack of an in vitro model that could faithfully recapitulate HCMV infection of the developing human brain. Disclosed herein are hiPSC-derived brain organoids to model effects of HCMV infection on early human brain development in a 3D human brain organoid system. As demonstrated in the working examples, the "clinical-like" HCMV strain TB40/E can efficiently infect hiPSC-derived brain organoids and propagate in these organoids, thereby impairing brain organoid growth and cortical structure, a phenotype reminiscent of HCMV-induced microcephaly. Moreover, HCMV infection of human brain organoids can result in drastically abnormal calcium signaling and neural network activity. The neurodevelopmental defects induced by TB40/E in infected brain organoids can be largely prevented by NAbs that target the HCMV PC, a primary target of protective antibody responses and pivotal component of current subunit vaccine designs to prevent intrauterine HCMV transmission[47]. Other publications also describe effects of HCMV infection on early human brain development using human brain organoid models[48, 49].

Human induced pluripotent stem cell (hiPSC)-derived brain organoids have emerged as a powerful in vitro model to study human brain development and neurodevelopmental diseases in a three-dimensional (3D) cellular biosystem[11-14]. These so-called "mini brains" can organize into discrete and interdependent brain regions that are reminiscent of the human cortex and form multilayered structures containing inner neural progenitor zones and outer cortical layers[15]. Brain organoids have been used to model neurological defects caused by Zika virus[14], which has been linked to microcephaly[16, 17].

To model the clinical effects of HCMV infection on early human brain development, hiPSC-derived brain organoids at day 45 of differentiation[15, 18] were used. This stage of hiPSC-derived brain organoids is reminiscent of early human fetal brain development at the transition between the first and second trimester[19], when congenital HCMV infection is known to be associated with severe neurological consequences[7, 50]. The observation that HCMV can severely impair the growth, structure, and neural network activity of hiPSC-derived brain organoids provides a possible explanation for HCMV-induced neurological defects during early gestation[2]. The data disclosed herein are consistent with the clinical manifestation of HCMV-induced microcephaly, including abnormal cortical development[8, 51]. Clinical data for neural network activity or brain electrophysiology in patients congenitally infected with HCMV is limited[2]. The findings in TB40/E-infected brain organoids disclosed herein may therefore provide novel insights into the dramatic consequences that congenital HCMV infection could have on neural network formation during early human brain development.

As disclosed in the working examples, brain organoids were generated from human iPSCs to model brain defects caused by HCMV infection in vitro in a 3D human cellular biosystem. The hiPSC-derived brain organoids were infected with the "clinical-like" HCMV strain TB40/E to determine how HCMV infection impacts early human brain development, potential cellular receptors that mediate brain cell infection by HCMV were determined, and the capacity of neutralizing antibodies (NAbs) to prevent HCMV-induced brain malformation were tested.

In humans, HCMV-immune labeled cells can be found ubiquitously distributed in the ventricular zone, subventricular zone, and cortical plate in the brains of congenitally-infected fetuses[8]. Although HCMV can target different cell types in the brains of congenitally infected fetuses, it shows higher tropism to neural progenitor cells[8]. It is shown that HCMV primarily infects the TBR2+ cells in the SVZ of the brain organoids and that HCMV infection of the brain organoids disrupts the organization of the SVZ and the formation of proper cortical layers, suggesting that HCMV targets predominantly neural progenitors in the SVZ, thereby impairing cortical development. HCMV infection at early stage of human brain development could dramatically affect the expansion of the neocortex and consequently lead to reduced brain size and impaired brain function. While the brain organoid model may provide a direct link between HCMV infection of the human brain and the development of microcephaly, severe neurological conditions due to congenital HCMV infection may also result from HCMV-induced placental insufficiency, which could lead to nutrition or oxygen deprivation in the fetal compartment[2].

To support the relevance of the brain organoid model to study HCMV infection of the developing human brain, potential cellular receptors that are involved in brain organoid infection by TB40/E were evaluated. Consistent with recent findings for HCMV entry[39, 40, 52, 53], TB40/E infection of human brain organoid involves PDGFRα and EGFR as cellular receptors either directly or indirectly, whereas the infection does not appear to involve cellular integrins. While PDGFRα has been shown to function as a cellular receptor during HCMV entry into fibroblasts via interaction with a trimeric complex composed of gH/gL/gO[52, 54, 55], EGFR is thought to be involved in PC-mediated entry into epithelial cells[52, 56]. As demonstrated in the working examples, both PDGFRα and EGFR are important for TB40/E infection of human brain organoid, as siRNA-mediated knockdown of either PDGFRα or EGFR completely abrogated the susceptibility of brain organoids to TB40/E. Unlike previous findings with fibroblasts and epithelial cells that implicate either PDGFRα or EGFR as important receptor for HCMV entry into host cells, the brain organoid study suggests that both PDGFRα and EGFR are important for efficient HCMV infection of cell types in the developing human brain. This observation suggests that infection of human brain cells by HCMV could be orchestrated by multiple HCMV envelope glycoproteins complexes.

As demonstrated in the working examples using two previously isolated NAbs, 1B2 and 62-11[36, 37] which were raised against the HCMV PC by vaccination, targeting epitopes of the PC can potently prevent the infection of brain organoids by HCMV, thereby allowing normal human brain organoid development. HCMV NAbs targeting the PC or other envelope glycoprotein complexes have been characterized using various cell types, including fibroblasts, epithelial/endothelial cells, monocytes/macrophages, and cells of the human placenta[36, 57-59]. Yet, the capacity of NAbs to prevent HCMV infection of human brain cells has not been reported. This study demonstrates that both 1B2 and 62-11 NAbs can potently prevent HCMV infection of human brain organoids, suggesting that NAbs targeting the PC may have the capacity to effectively prevent HCMV infection of the developing human brain. Notably, the maximum NAb concentration (4 µg/ml) used to model the prevention of HCMV infection of the brain organoids was more than 50 times lower than monoclonal antibody concentrations found in human serum post intravenous infusion of PC-specific NAbs in healthy adults or kidney transplant recipients[60, 61]. Considering that fetal IgG concentrations at weeks 17-22 are about 5-10% of the maternal IgG levels[62], this may suggest that maternal monoclonal antibody concentrations of 20-40 µg/ml could potentially reach the fetal compartment at a time point of gestation when HCMV-induced fetal brain damage is most severe[7]. As the embryo blood-brain-barrier is considered to be immature or "leaky", antibodies that enter the fetal circulation from the mother during early gestation are thought to have direct access to the fetal brain[63, 64], suggesting that vaccine-induced or passively-administered NAbs may have the potential to prevent HCMV-related brain diseases during early fetal development. Given that the antibodies used in this study were isolated from PC-immunized mice, clinical application of these antibodies to reduce or prevent neurodevelopmental defects caused by HCMV would require their humanization to allow for Fc binding and to prevent development of a potentially harmful human anti-mouse antibody response[65].

There has been controversy about the protective capacity of antibodies in prevention of congenital HCMV infection[32, 66], especially in light of imperfect protection by naturally acquired HCMV immunity[3]. While a recent study using samples from a high seroprevalence population did not find a correlation between PC-specific or gH/gL/gO-specific antibody titers and the prevention of congenital transmission[67], other studies reported a correlation between PC-specific or gB-specific antibodies and reduced intrauterine HCMV transmission following primary maternal infection[33, 35]. In addition, a recent study using the highly relevant rhesus macaque model of congenital CMV infection has shown that passively transferred, pre-existing antibodies with high neutralizing activity can protect against CMV vertical transmission and fetal demise[68]. While the precise reasons for the difference in the protective capacity of CMV-specific antibodies observed in these studies are unclear, they could be related to differences in epitope specificity, affinity, potency, or function of the antibody response. This study indicates that pre-existing PC-specific or gH-specific NAbs transferred from the mother to the fetus following passive or active immunization may have the capacity to prevent severe fetal brain malformation by HCMV that has crossed the fetal-maternal interface.

Thus, based on hiPSC-derived brain organoids modeling the effects of HCMV infection on early human brain development with different HCMV stains, this disclosure demonstrates that HCMV infection of hiPSC-derived brain organoids can result in severely impaired brain organoid growth and structure as well as altered calcium signaling and neural network activity, phenotypes that mimic HCMV-induced neurological conditions, such as microcephaly. In addition, this disclosure demonstrates that severely impaired brain organoid development caused by HCMV can be effectively prevented by NAbs that target the HCMV PC, suggesting that PC-specific NAbs may have the capacity to prevent HCMV-induced neurodevelopmental deficits. This 3D organoid model provides a powerful system to study HCMV-induced brain malformation and to identify potential antiviral agents that could prevent abnormal brain development due to congenital HCMV infection.

The following examples are intended to illustrate various embodiments of the invention. As such, the specific embodiments discussed are not to be constructed as limitations on the scope of the invention. It will be apparent to one skilled in the art that various equivalents, changes, and modifications may be made without departing from the scope of invention, and it is understood that such equivalent embodiments are to be included herein. Further, all references cited in the disclosure are hereby incorporated by reference in their entirety, as if fully set forth herein.

EXAMPLES

Materials and Methods

Human iPSC Derivation. AG14048 and IMR90 (I90) human fibroblasts were purchased from Coriell. AG14048 iPSCs were generated from AG14048 fibroblasts through episomal reprogramming using episomal plasmids expressing OCT4, SOX2, L-MYC, KLF4, shp53, and EBNA1 (Addgene plasmids pCXLE-hSK, pCXLE-hUL, pCXLE-hOCT3/4-shp53-F, and pCXWB-EBNA1)[69, 70]. Derivation of I90 iPSCs were described previously[71]. Specifically, human fibroblast cells were electroporated with the reprogramming factors using 4D Nucleofector (Lonza) and seeded into 6-well plates coated with 1:100 diluted Matrigel (Corning) and maintained in E8 medium (Invitrogen). iPSCs were maintained at 37° C. in Matrigel-coated 6-well plates with daily medium change and passaged every 3-4 days using 0.5 mM EDTA (GIBCO) treatment and manual dissociation. Both AG14048 and I90 iPSC lines generated in this study were authenticated using short tandem repeat (STR) assay.

Cell Lines. ARPE-19 (male) and MRC-5 (male) cells were purchased from ATCC and maintained in Dulbecco's minimal essential medium (DMEM) or minimal essential medium (MEM), respectively, supplemented with 10% fetal bovine serum (FBS). All cell lines were cultured at 37° C. and 5% $CO_2$.

Viruses. GFP-labeled TB40/E and TR viruses that express a GFP reporter under the SV40 promoter were derived from BAC DNA, kindly provided by T. E. Shenk and E. A. Murphy (Princeton University, NJ)[25, 38]. GFP-tagged Towne virus (RC2940) that expresses an IE2/GFP fusion protein, was obtained from E. S. Mocarski (Emory University School of Medicine, GA)[26]. TB40/E-Gluc virus expressing a luciferase gene under the IE promoter was reconstituted from BAC DNA, kindly provided by S. Sinzger (Ulm University, Germany)[31]. TB40/E viral stocks were generated following viral propagation in ARPE-19 cells, whereas Towne virus stocks were generated following viral propagation in MRC-5. Viral stocks were generated by standard ultracentrifugation procedures as described previously[37, 72] and titrated on MRC-5 by immunostaining using the IE1-specific monoclonal antibody p63-27[73] (kindly provided by William Britt, University of Alabama at Birmingham) and the Vectastain ABC kit and 3,3'-diaminobenzidine (DAB) substrate according to the manufacturer's instructions. Images were taken using a DMi8 inverted microscope equipped with a linear motorized stage.

Generation of brain organoids from hiPSCs. hiPSC-derived brain organoids were generated based on the protocol described by Lancaster et al.[15] with modifications. Briefly, hiPSCs were generated from IMR-90 and AG14048 human fibroblasts, confirmed to be karyotypically normal and negative for *mycoplasma* contamination. On day 0 of organoid culture, hiPSCs were dissociated with EDTA, and seeded in suspension in a 6-well plate to form embryoid bodies in E8 medium with 5 µM ROCK inhibitor Y-27632. From day 1 to day 4, cells were cultured in E8 medium without ROCK inhibitor with daily medium change. On day 5, E8 medium was replaced by neural induction medium (NIM) containing DMEM-F12, 1×N2 supplement, 1× minimum essential medium NEAA (MEM-NEAA), and 2 µg/ml Heparin. On day 8, the spheres were embedded in 20-25% Matrigel in NIM in a 6-well suspension plate and incubated at 37° C. for 4 hours, followed by gentle addition of 2 ml of the NIM. On day 10-12, brain organoids were lifted and transferred to a new 6-well plate. NIM was changed daily from day 5 to day 15. On day 15, brain organoids were transferred to a T25 suspension culture flask and cultured in differentiation medium containing DMEM-F12, 1× N2 supplement, 2.5 µg/ml Insulin, 1× Glutamax, 0.5× MEM-NEAA, 3.5 µl/L (V/V) 2-Mercaptoethanol, and 1× B27 supplement on an Orbi-Shaker (Benchmark Scientific) at 50 rpm rotating speed. Medium was changed every 2-3 days. Organoids that exhibited similar size and passed the quality control criteria described by Lancaster et al.[15, 18] were used for the study. The criteria include clear embryoid body border, formation of organized neuroepithelium before embedding, formation of ventricle-like structure, and development of defined bud in Matrigel without premature differentiation.

The media ingredients and the protocol for producing the hiPSC-derived brain organoids are summarized in Table 1 and Table 2, respectively.

TABLE 1

| Media Ingredients | |
| --- | --- |
| EB medium | E8 |
| Neural induction medium | DMEM-F12 with N2, MEM-NEAA, and heparin |
| Differential medium | DMEM-F12 with N2, B27, insulin, GlutaMAX, MEM-NEAA, 2-mercaptoethanol |

TABLE 2

| Brain Organoids Protocol | |
| --- | --- |
| EB medium | 5 days |
| Neural induction medium (suspension) | 3 days |
| Neural induction medium with Matrigel (stationary) | 20-25% Matrigel, 2-4 days |
| Neural induction medium (stationary) | 3-5 days |
| Differential medium | Shaking for maintaining, shaker |
| Screening | Day 20-40 |

HCMV infection of brain organoids. Brain organoids at day 45 of differentiation were seeded in 24-well plates and exposed to $5\times10^5$ pfu/ml of HCMV virus for 24 hours. Following infection, 1 ml medium was replaced, and each organoid was placed in a single well for the duration of the experiment. At different time points post infection, each organoid was evaluated for GFP fluorescence intensity and organoid size in diameter using the same microscopy setting during each experiment.

Brain organoid treatment with NAbs. 1B2 and 62-11 NAbs at final concentrations ranging from 3.2 ng/ml to 4000 ng/ml were incubated with $5\times10^5$ pfu/ml of HCMV for 1 hour at 37° C. and then transferred to brain organoid-containing wells. Normal mouse IgG was used as a control at the concentration of 2000 ng/ml. For proliferation assay, brain organoids were incubated with 10 µM BrdU for 2 hours and fixed in 4% paraformaldehyde (PFA) for 1 hour, followed by immunostaining.

Immunostaining. Cells on coverslip were fixed with 4% PFA in PBS for 15 minutes at room temperature. Brain organoids were fixed with 4% PFA for 1 hour and submerged in 30% sucrose overnight. The samples were embedded in OCT and sectioned at a thickness of 14 or 20 µm using Leica CM3050S. Cells or brain organoid sections were permeabilized and blocked with blocking solution (1×PBS containing 0.1% Triton X-100 and 5% normal donkey serum) for 1 hour. Primary antibodies in blocking solution were then added and incubated at 4° C. for overnight, followed by washing and incubation with secondary antibodies. Cells were counterstained with DAPI before mounting.

The following antibodies were used: TUJ1 (Covance PRB-435P, rabbit or mouse, 1:20,000), MAP2 (Abcam ab5392, chicken, 1:5000), SOX2 (Santa Cruz sc-17320, goat, 1:1000), CTIP2 (Abcam, ab18465, rat, 1:300), SABT2 (Abcam ab92446, mouse, 1:300), TBR2 (Abcam ab31940, rabbit, 1:300); BRN2 (Santa Cruz sc-28594, rabbit, 1:200), TLX (Shi lab20, rabbit, 1:1000), BrdU (Accurate Chemical & Scientific Corp OBT0030, Rat, 1:6000), Cleaved Caspase3 (Cell Signaling 9661, rabbit, 1:200).

Images were obtained with a Carl Zeiss LSM700 confocal microscope or Nikon Eclipse TE-2000-S microscope. Cortical layer thicknesses, brain organoid size and GFP fluorescence intensity of brain organoids were measured by Image J. For measuring the layer thickness, small rectangles were drawn to ensure two opposite sides to align with both layer marker dashed lines.

Calcium imaging. Brain organoids at day 45 of differentiation were partially dissociated and seeded on Matrigel-coated Ibidi µ-slide 8-well-chamber slides and allowed to grow for 3 days until calcium imaging was performed. Brain organoids were rinsed in artificial-cerebrospinal fluid (ACSF) (124 mM NaCl, 2.5 mM KCl, 26 mM $NaHCO_3$, 1 mM $MgCl_2$, 2 mM $CaCl_2$, 1.25 mM $NaH_2PO_4$ and 10 mM D-glucose solution) at 37° C. for 10 minutes and then incubated in fresh 95% O2 oxygenated ACSF containing 2 µM Fluo-4 AM for 20 minutes. Subsequently, brain organoids were visualized using a Zeiss Axio Observer Z1 microscope for serial time lapse imaging. Time lapse imaging was acquired at 10× magnification and at 16 frames per second speed for 5 minutes using a Hamamatsu EMCCD model C9100-13. Glutamate (3 µM) stimulation during imaging progress was performed 5 seconds after start. $Ca^{2+}$ imaging videos were captured and processed using ZEN software and quantification was performed using Image-Pro Premier 9.1. Fluorescence intensity change over time is defined as: $\Delta F/F=(F-Fo)/Fo$, where F is the fluorescence intensity at any time point, and Fo is the baseline fluorescence intensity averaged across the whole movie for each cell. For calcium imaging of HCMV (TB40/E-Gluc without GFP)-infected brain organoids at day 45 of differentiation, organoids were partially dissociated and allowed to attach overnight onto Matrigel-coated Ibidi µ-Slide 8 Well chamber slide. Brain organoids were either exposed to HCMV at $5\times10^5$ pfu/ml per brain organoid or to a mixture of HCMV and NAb 1B2. For NAb treatment, the same amount of virus was incubated with 4,000 ng/ml 1B2 antibody at 37° C. for 1 hour before addition to the brain organoid culture. As a control, brain organoids were infected with $5\times10^5$ pfu/ml UV-inactivated HCMV. Calcium imaging was performed 3 days post infection. In order to identify cells that were infected by HCMV, calcium imaging data of each area were recorded with the associated coordinates using most bottom-right corner as a reference (0, 0). Right after calcium imaging, the brain organoids were immediately fixed with 4% PFA and immunostained for HCMV IE. For imaging, the fields were chosen based on the calcium imaging video coordinates and the positions were adjusted manually to match the original calcium imaging video pictures. By using this procedure, the HCMV positive cells were located by IE1 positive staining.

Microelectrode Arrays (MEA). Brain organoids at day 45 of differentiation were partially dissociated and seeded onto 12-well transparent MEA plates at three brain organoids per well. Brain organoids were cultured in BrainPhys medium, including 1×B27, 1×N2, 20 ng/ml GDNF, 20 ng/ml BDNF, 500 µg/ml Dibutyryl-cAMP, 1× Glutamax, and 1× NEAA. MEA recordings were performed at 37° C. in a Maestro MEA system with AxIS software using a bandwidth with a filter for 10 Hz to 2.5 kHz cutoff frequencies. Spike detection was performed using an adaptive threshold set to 5.5 times of the standard deviation of the estimated noise on each electrode. For recordings, following a 5-minute resting time in the Maestro instrument, each plate was recorded for 10 minutes to calculate the spike rate per well. When a recording of 5 spikes over the length of 1 minute (5 spikes per minute) was obtained, the electrode was considered active. Individual electrode bursts were identified using an adaptive Poisson surprise algorithm, while network bursts were identified for each well using a non-adaptive algorithm requiring a minimum of 10 spikes with a maximum interspike interval of 100 ms. Multielectrode data analysis was performed using the Axion Biosystems NeuralMetrics Tool. Synchrony index was calculated by NeuralMetric Tool with synchrony window set as 20 ms. For the pharmacological experiment, CNQX (10 µM) or bicuculline (10 µM) were applied to plate immediately before recording. For MEA recording, brain organoids treated with UV-irradiated TB40/E were included as the control organoids. Brain organoids were exposed to TB40/E or UV-irradiated TB40/E at $5 \times 10^5$ pfu/ml per brain organoid in the presence of 4000 ng/ml IgG. For NAb treatment, $5 \times 10^5$ pfu/ml of TB40/E was incubated with 4000 ng/ml NAb 1B2 for 1 hour and then added to brain organoids cultures. Wave forms of spike were generated from exported recording data on single electrode and the graph was created in Excel. The phase contrast and GFP fluorescent images of organoids seeded in the MEA plates were taken after MEA recording.

Generation of NPCs from human iPSCs. hiPSC-derived NPCs were generated according to previously described procedures[74]. Briefly, IMR90 hiPSCs were dissociated with Accutase into single cells and seeded onto a Matrigel-coated 6-well plate at $1 \times 10^5$ cells per well in E8 medium containing 1 µM Y-27632. On the next day, the E8 medium was substituted with NPC induction medium, including E6 medium, 100 nM ATRA, 10 µM SB431542, 250 nM LDN-193189, and the NPC induction medium was changed every day for 8 days. Cells were then transferred to a T25 or T75 flask and maintained in NPC maintenance medium containing 1× B27, 1×N2 supplement, 1×NEAA, 1× Glutamax, 100 nM ATRA, 3 µM CHIR99021, 2 µM SB431542, 10 ng/ml EGF and 10 ng/ml FGF, with daily medium change.

Neuronal differentiation from NPCs. Three million hiPSC-derived NPCs were dissociated with Accutase and seeded on Matrigel-coated 10 cm plates in neural induction medium containing DMEM/F12, 1× N2, 1×B27, 1× NEAA, 1×Glutamax. Cells were cultured in this medium for 3 weeks and then transferred to BrainPhys medium and maintained in the medium with medium change every 4-5 days.

RNA-sequencing. hiPSC-derived brain organoids at day 45 differentiation were infected with $5 \times 10^5$ pfu/ml TB40/E or UV-irradiated TB40/E as a control. Total RNA was isolated from TB40/E-infected organoids or control organoids 15 days post infection using Trizol. RNA quality control was performed by the Integrative Genomics Core at City of Hope. RNA-sequencing reads were aligned against the human genome (hg19) using TopHat275. Read counts were quantified using htseq-count with UCSC known gene annotations. Aligned reads were counted using GenomicRanges. Genes were filtered to only include transcripts with RPKM values greater than 0.1 (after a rounded log 2-transformation) in at least 50% samples. Genes smaller than 150 bp were removed prior to differential expression analysis. Log2 (RPKM+0.1) expression values were used for visualization and fold-change calculations. Normalization of heatmap values was performed as the following: RNA seq of control sample was converted by Log10 of the RPKM value, the HCMV infected sample value was determined by sum=log 10 (RPKM value)+DEseq2−log 2 (fold change value). Heatmap was generated by ClustVis and image was prepared using Photoshop.

RT-qPCR analysis. For siRNA knockdown of receptors in iPSC-derived NPCs, total RNA was extracted using Trizol Reagent. cDNAs were reverse transcribed using Tetro cDNA synthesis kit. RT-qPCR was performed using DyNAmo Flash SYBR Green qPCR mix on a StepOnePlus system and normalized to β-actin. Primers used in the qPCR are listed in Table 3.

TABLE 3

| REAGENT or RESOURCE | SOURCE | IDENTIFIER |
|---|---|---|
| Antibodies | | |
| Mouse monoclonal anti-CMV IE-1 clone p63-27 | Andreoni et al, 1989 | N/A |
| Mouse monoclonal anti-CMV PC clone 1B2 | Chiuppesi et al., 2015 | N/A |
| Mouse monoclonal anti-CMV gH clone 62-11 | Chiuppesi et al., 2015 | N/A |
| Normal mouse IgG | Santa Cruz Biotechnologies | Cat# sc-2025; RRID: AB_737182 |
| Rabbit anti-TUJ1 | Covance | Cat# PRB-435P; RRID: AB_10616742 |
| Chicken anti-MAP2 | Abcam | Cat# Abcam ab5392; RRID: AB_2138153 |

TABLE 3-continued

| REAGENT or RESOURCE | SOURCE | IDENTIFIER |
|---|---|---|
| Goat anti-SOX2 | Santa Cruz Biotechnologies | Cat# sc-17320; RRID: AB_2286684 |
| Rat anti-CTIP2 | Abcam | Cat# ab18465; RRID: AB_2064130 |
| Mouse anti-SABT2 | Abcam | Cat# ab92446; RRID: AB_10563678 |
| Rabbit anti-TRB2 | Abcam | Cat# ab31940; RRID: AB_2200219 |
| Rabbit anti-BRN2 | Santa Cruz Biotechnologies | Cat# sc-28594 RRID: AB_2167382 |
| Rabbit anti-TLX | Li et al., 2008 | N/A |
| MAb Rat anti-BrdU | Accurate Chemical & Scientific Corp | Cat# OBT0030 RID: AB_2341179 |
| Rabbit anti-cleaved Caspase-3 | Cell Signaling | Cat# 9661 RRID: AB_2341188 |
| Bacterial and Virus Strains | | |
| TB40/E-GFP | O'Connor and Murphy, 2012 | N/A |
| TR-GFP | Murphy et al., 2003 | N/A |
| TOWNE-GFP (clone RC2940) | Cherrington and Mocarski, 1988 | N/A |
| TB40/E-Gluc | Falk et al., 2016 | N/A |
| Chemicals, Peptides, and Recombinant Proteins | | |
| ROCK inhibitor Y-27632 dihydrochloride | Stemgent/ Reprocell | Cat # 04-0012-10 |
| Bicuculline | Tocris | Cat # 0130 |
| Retinoic acid | Sigma | Cat # R2625 |
| CHIR99021 | Cellagen Technology | Cat # C2447-2s |
| LDN-193189 | Cellagen Technology | Cat # C5361-2s |
| SB431542 | Cellagen Technology | Cat # C7243-5 |
| Matrigel | Corning | Cat # 354230 |
| CNQX disodium salt | Tocris | Cat # 1045 |
| N2 supplement | Life Technologies | Cat # 17502048 |
| B27 supplement | Thermo Fisher Scientific | Cat # 17504044 |
| Essential 8 Medium | Life Technologies | Cat # A1517001 |
| Human Recombinant Insulin solution | Sigma | Cat # I9278 |
| MEM NEAA | Thermo Fisher Scientific | Cat # 11140076 |
| DMEM-F12 | Gibco | Cat # 11330-032 |
| BrainPhys medium | STEMCELL Tech | Cat # 05790 |
| GDNF | PeproTech | Cat # 450-10 |
| BDNF | PeproTech | Cat # 450-02 |
| Dibutyryl-CAMP | Sigma Aldrich | Cat # D0627 |
| ATRA | Sigma Aldrich | Cat # R2625 |
| EGF | PeproTech | Cat # 100-15 |
| FGF | PeproTech | Cat # 100-18B |
| Trizol | Invitrogen | Cat # 15596018 |
| Gibco GlutaMAX Supplement | Invitrogen | Cat # 35050079 |
| siLentFect Lipid Reagent for RNAi | Bio-Rad | Cat # 1703361 |
| DyNAmo Flash SYBR Green qPCR mix | Thermo Fisher Scientific | Cat # F416 |
| PMSF | Roche | Cat # 837091 |
| Fluo-4, AM | Thermo Fisher Scientific | Cat # F14201 |
| Critical Commercial Assays | | |
| VECTASTAIN Elite ABC HRP Kit (Peroxidase, Mouse IgG) | Vector Laboratories | Cat # PK-6102 |
| DAB Peroxidase (HRP) Substrate Kit, 3, 3'-diaminobenzidine | Vector Laboratories | Cat # SK-4100 |
| Tetro cDNA synthesis kit | Bioline | Cat # Bio-65043 |
| Amaxa P3 primary 4D-Nucleofector X kit L | Lonza | Cat # V4XP-3024 |
| Deposited Data | | |
| RNAseq data of mock and hCMV infected brain organoids | This study | GSE145415 |

TABLE 3-continued

| REAGENT or RESOURCE | SOURCE | IDENTIFIER |
|---|---|---|
| Experimental Models: Cell Lines | | |
| Human: IMR-90 fibroblasts | Coriell Institute | Cat # I90-10 |
| Human: AG14048 fibroblasts | Coriell Institute | Cat # AG14048 |
| Human: ARPE-19 | ATCC | Cat # CRL-2302 |
| Human: MRC-5 | ATCC | Cat # CCL-171 |
| Experimental Models: Organisms/Strains | | |
| Oligonucleotides | | |
| EGFR-siRNA: 5'-GAC GGC GUC CGC AAG UGU A -3' (sense, SEQ ID NO: 1) and 5'-UAC ACU UGC GGA CGC CGU CUU-3' (antisense, SEQ ID NO: 2) | This study | N/A |
| PDGFRα-specific siRNA: 5'-CCA CCU UCA UCA AGA GAG A-3'(sense, SEQ ID NO: 3) and 5'-UCU CUC UUG AUG AAG GUG GAA-3' (antisense, SEQ ID NO: 4) | This study | N/A |
| ITGA3-specific siRNA: 5'-GCU ACA UGA UUC AGC GCA A-3' (sense, SEQ ID NO: 5) and 5'-UUG CGC UGA AUC AUG UAG CUG-3' (antisense, SEQ ID NO: 6) | This study | N/A |
| ITGA5-specific siRNA: 5'-GGG AAC CUC ACU UAC GGC U-3' (sense, SEQ ID NO: 7) and 5'-AGC CGU AAG UGA GGU UCC CUU-3' (antisense, SEQ ID NO: 8) | Dharmacon | Cat# L-004124-00-0005 |
| Integrin β3 siRNA: 5'-CCA GAU GCC UGC ACC UUU A-3' (SEQ ID NO: 9), 5'-GCC AAC CCA CUG UAU A-3' (SEQ ID NO: 10), 5'-GAA GAA CGC GCC AGA GCA A-3' (SEQ ID NO: 11), and 5'-GCA GUG AAU UGU ACC UAU A-3' (SEQ ID NO: 12) | This study | N/A |
| Recombinant DNA | | |
| pHIV-T2A-DsRed plasmid | Dr. Xiuli Wang from City of Hope | N/A |
| pBABE-EGFR WT plasmid | Greulich et al., 2005 | Addgene Cat# 11011; RRID: Addgene_11011 |
| pDONR223-PDGFRα plasmid | Johannessen et al., 2010 | Addgene Cat# 23892; RRID: Addgene_23892 |
| pCXLE-hSK | Addgene | Cat# 27078 |
| pCXLE-hUL | Addgene | Cat# 27080 |
| pCXLE-hOCT3/4-shp53-F | Addgene | Cat# 27077 |
| pCXWB-EBNA1 | Addgene | Cat# 37624 |
| pcDNA-PDGFRα | This study | N/A |
| pHIV-EGFR-T2A-DsRed | This study | N/A |
| Software and Algorithms | | |
| Prism version 7 | Graphpad Prism | https://www.graphpad.com/scientific-software/prism/ |
| ZEN software | Carl Zeiss | https://www.zeiss.com/microscopy/us/products/microscope-software/zen.html |
| Image-Pro Premier 9.1 | Media Cybernetics | http://www.mediacy.com/support/imageproropremier |
| AxIS software | Axion Biosystems | https://www.axionbiosystems.com/products/axis-software |
| AxIS Metrics Tool | Axion Biosystems | https://www.axionbiosystems.com/products/axis-software |
| NeuralMetric Tool | Axion Biosystems | https://www.axionbiosystems.com/products/axis-software |
| ClustVis | N/A | https://biit.cs.ut.ee/clustvis/ |
| Other | | |
| CytoView MEA 12 plate | Axion BioSystems | Cat # M768-GL1-30Pt200-5 |
| Maestro MEA system | Axion BioSystems | Equipment |
| Hamamatsu EMCCD | Hamamatsu | Model C9100-13 |
| Orbi-Shaker | Benchmark Scientific | NC0483060 |

RNA interference. Oligonucleotides for siRNA-mediated RNA interference were synthesized by Integrated Device Technology. Oligonucleotides used for RNA interference were listed in Table 1. For RNA interference in brain organoids, four brain organoids with similar size were seeded in ultralow 24-well plates (one organoid per well) and transfected with siRNA using siLentFect. After 96 hours incubation, each organoid was infected with TB40/E at $5 \times 10^5$ pfu/ml. Medium was changed the following day. Brain organoids were cultured for 20 days on shaker with continuous medium change every 3-4 days.

Western blot analysis. Cells were lysed in 0.1 M $Na_2CO_3$ containing 2 mM PMSF, and cell lysates were sonicated using Sonic Dismembrator to disintegrate genomic DNA. Protein concentrations were measured by Bradford Assay. Forty µg total proteins of NPCs and neurons were loaded for Western blot analysis. EGFR and PDGFRα antibodies were used at 1:1000 dilution.

Plasmids. EGFR WT was a gift from Matthew Meyerson (Addgene plasmid #11011; n2t.net/addgene:11011; RRID: Addgene_11011). The pHIV7-EGFR-T2A-DsRed vector was generated by cloning the human EGFR coding region via SwaI and NotI sites into the plasmid pHIV-T2A-DsRed (kindly provided by Dr. Xiuli Wang from City of Hope), resulting in the EGFR expression vector. pDO NR223-PDGFRA was a gift from William Hahn & David Root (Addgene plasmid #23892; n2t.net/addgene:23892; RRID: Addgene_23892). The pcDNA-PDGFRα vector was created by cloning the human PDGFRα cDNA into pcDNA3.1(+) neo vector using NheI and SmaI sites. The sequences of the cDNA were verified by Sanger sequencing.

hiPSC electroporation and HCMV infection. Control DsRed plasmid DNA or the mix of EGFR-T2A-DsRed and PDGFRα plasmid DNAs were introduced into hiPSCs by electroporation using 4D-Nucleofector following manufacturer's instructions. Briefly, 3 million hiPSCs in single cell suspension were mixed with P3 solution and subjected to electroporation using program CA137. The electroporated iPSCs were immediately transferred onto Matrigel-coated 24-well plate in E8 medium containing 1 µM Y27632. The hiPSCs were subcultured twice in order to remove dead cells and subsequently allowed to attach on a Matrigel-coated 24-well plate at $2 \times 10^4$ cells/well. hiPSCs were infected with TB40/E at a MOI of 5 and harvested at 2 days after infection. The percent of CMV IE1-positive and DsRed-positive (CMV+DsRed+) cells out of total DsRed+ cells was quantified and plotted.

Statistical analysis. All statistical analyses were performed using GraphPad Prism7.0. Statistical details of experiments can be found in the figure legends. All data are shown as mean±SD or SE. The statistical significance of experiment outcome when comparing two or more groups was calculated using two-way ANOVA followed by Tukey's, Dunnet's or Sidak's multiple comparison tests or Student's t-test. The difference between experimental groups was considered significant when $p < 0.05$.

Data and code availability. The RNA-seq dataset generated during this study is available at NCBI. The GEO Accession Super Series ID is GEO: GSE145415.

Example 1: Generation and Characterization of hiPSC-Derived Brain Organoids

Figure 1B:
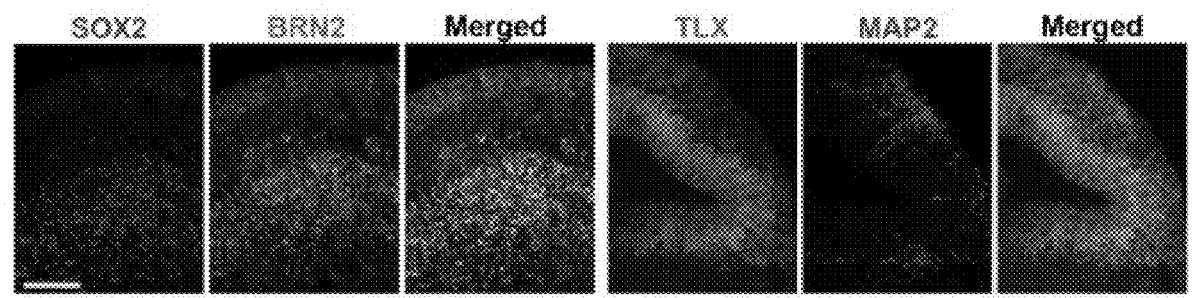
Figure 1C:
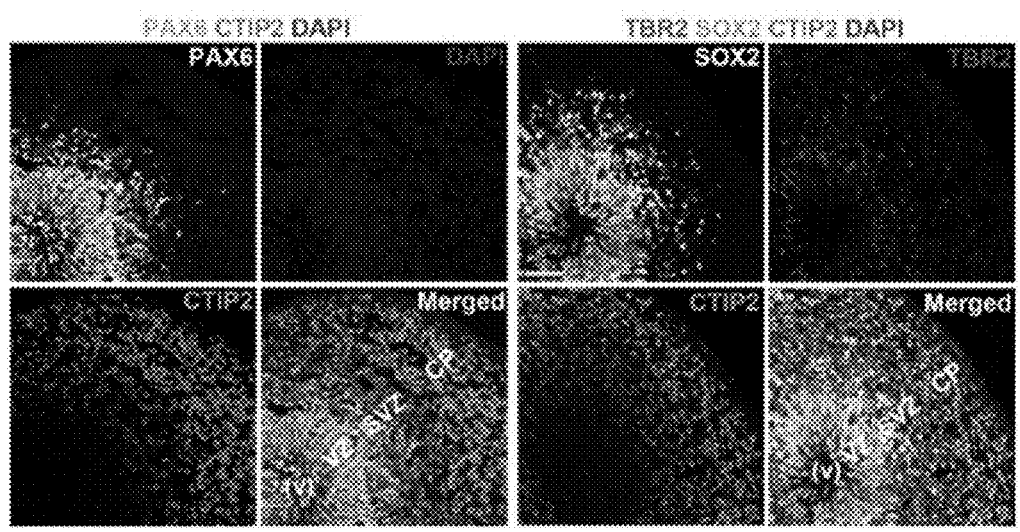
Figure 2:
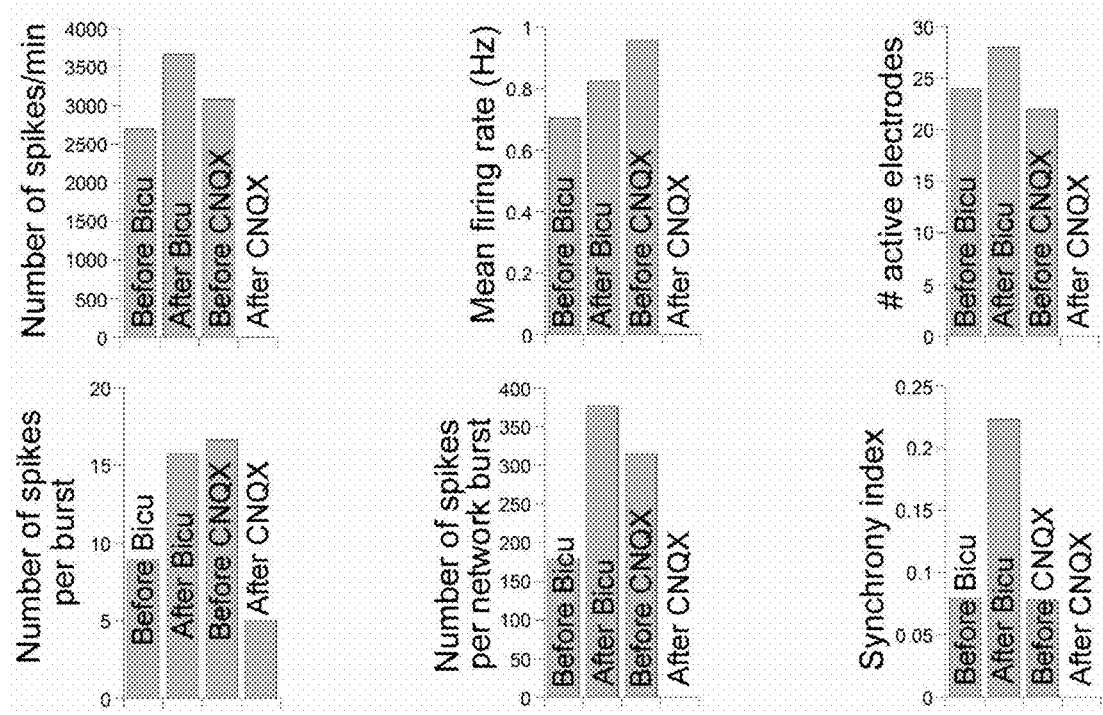
FIG. 2 illustrates the functional neuronal networks shown by MEA recording. Quantification of MEA parameters in brain organoids in 10 minutes recording before or after treatment with GABAergic neuronal inhibitor bicuculine (Bicu), and before or after glutamatergic neuronal inhibitor CNQX treatments.

To study the effects of HCMV infection on early human brain development, hiPSC-derived brain organoids were generated using a protocol similar to that described by Lancaster et al.[15, 18] the brain organoids were characterized at day 45 to day 75 of differentiation (FIG. 1A). This stage of hiPSC-derived brain organoids has been shown to mimic human fetal brain development at the transition between the first and second trimester of gestation[19]. The hiPSC-derived brain organoids developed into layered structures containing a core region positive for the neural progenitor markers SOX2 and TLX[20], and an outer layer positive for BRN2, a late-born superficial layer neuronal marker, and MAP2, a marker for mature neurons (FIG. 1B). Further characterization revealed the presence of the PAX6-positive apical progenitors, the cell body of which primarily locates in the ventricular zone (VZ), and the TBR2-positive basal progenitors, the cell body of which mostly resides in the subventricular zone (SVZ)[21] (FIG. 1C). The SOX2-positive progenitors were detected to span across the VZ and SVZ and the CTIP2-positive neurons that reside mainly in a region corresponding to the cortical plate (CP) (FIG. 1C). Calcium imaging of selected brain organoid regions revealed multiple synchronized calcium surges upon stimulation with glutamate (FIG. 1D). These results suggest the presence of mature and active neurons in hiPSC-derived brain organoids. Further characterization by multielectrode arrays (MEA) showed that the brain organoids formed a neuronal network with spontaneous, synchronized burst and spikes, which could be quenched by the glutamatergic neuron blocker CNQX, but not by the GABAergic neuron blocker bicuculline[22] (FIGS. 1E, 1F and FIG. 2). This result indicates that the neurons within the human brain organoids could form an electrophysiologically active neuronal network, which is characteristic of the development of interdependent cortical layers in the developing human brain[23, 24]. These results together indicate that hiPSC-derived brain organoids could recapitulate aspects of early human brain development.

Figure 3A:
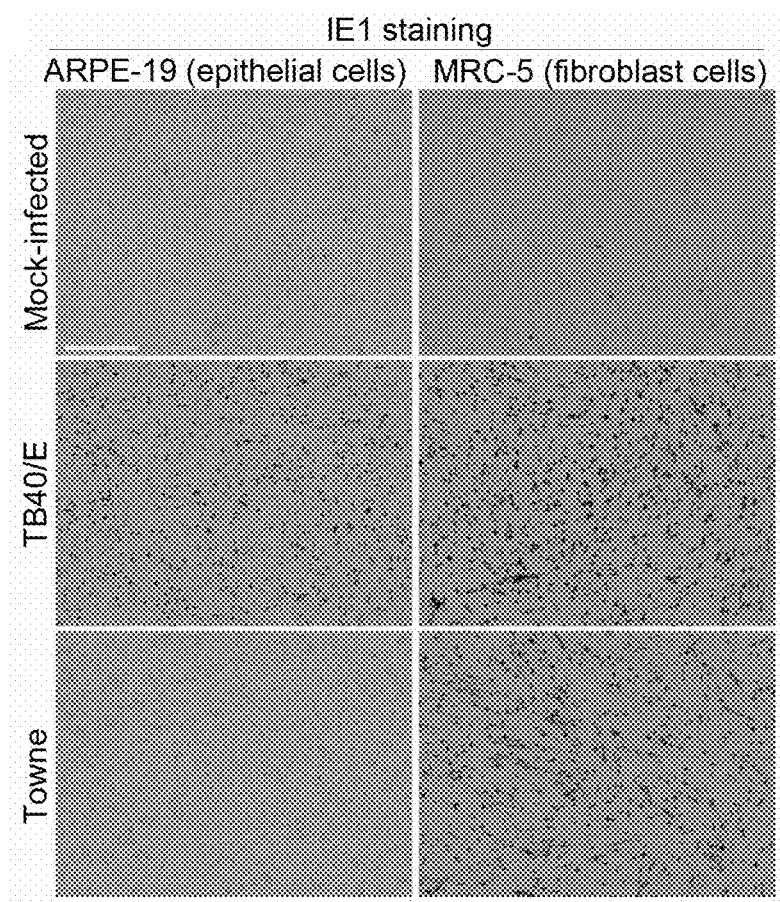
FIGS. 3A-3E show HCMV cell tropism and HCMV-induced abnormal cell proliferation and apoptosis in hiPSC-derived brain organoids.
Figure 3B:
Figure 3C:
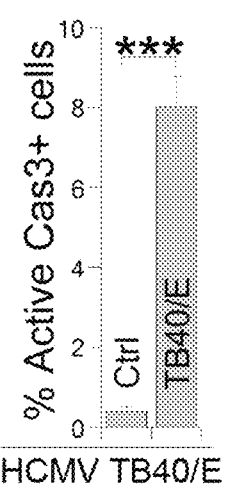
Figure 3D:
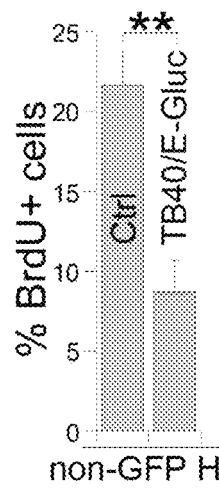
Figure 3E:
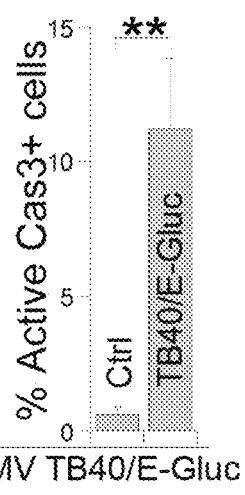

Example 2: HCMV TB40/E Impairs the Growth and Cortical Structure of hiPSC-Derived Brain Organoids Using recombinant viruses of HCMV strains TB40/E and Towne that express a GFP reporter[25, 26], the consequences of HCMV infection on the development of hiPSC-derived brain organoids were evaluated. In contrast to the laboratory HCMV strain Towne, the "clinical-like" HCMV strain TB40/E expresses the envelope pentamer complex (PC) and was able to efficiently infect both fibroblasts and epithelial cells, whereas Towne was only able to efficiently infect fibroblast, but not epithelial cells (FIG. 3A). These observations are consistent with previous findings[27-30].

Figure 4A:
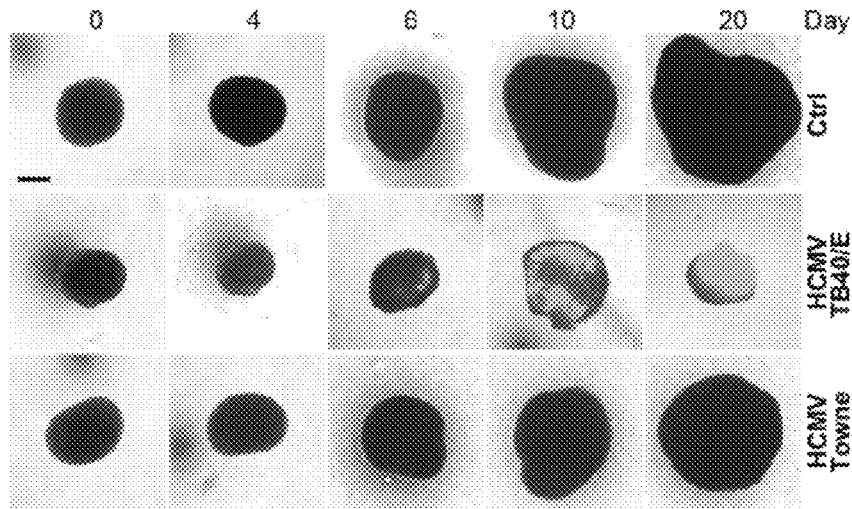
FIGS. 4A-4F shows that HCMV TB40/E impairs hiPSC-derived brain organoid development.
Figure 4B:
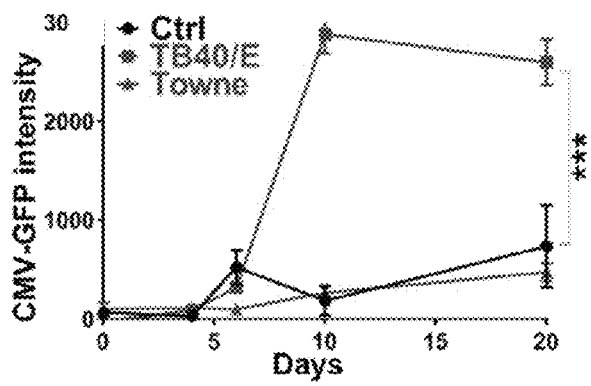
Figure 4C:
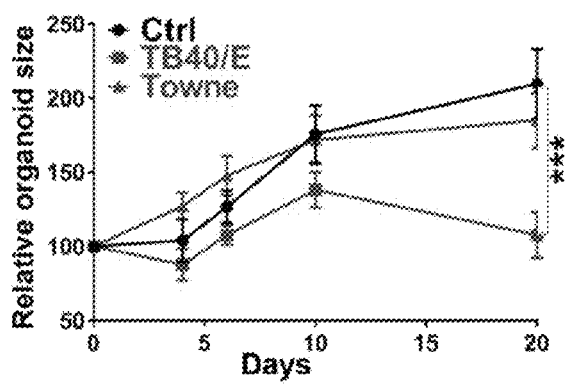

To determine the effect of HCMV infection on brain organoid growth, hiPSC-derived brain organoids at day 45 of differentiation were exposed to GFP-labeled TB40/E or Towne virus. The GFP fluorescence intensity and the brain organoid size were evaluated over a period of 20 days after viral exposure. Mock-infected brain organoids were used as a negative control. It was found that the "clinical-like" HCMV strain TB40/E could efficiently infect and propagate in the brain organoids and severely compromise the brain organoid growth, as revealed by an increase in GFP fluorescence intensity in the infected organoids and substantially reduced size of the infected brain organoids, when compared to the mock-infected brain organoid controls (FIGS. 4A-4C). In contrast, the laboratory HCMV strain Towne did not efficiently infect human brain organoids, therefore did not significantly impair the growth of brain organoids (FIGS. 4A-4C). These results indicate that the "clinical-like" HCMV strain TB40/E is able to infect human brain organoids and trigger reduced size of brain organoids, mimicking HCMV-induced microcephaly. Because the "clinical-like" HCMV strain TB40/E is PC-proficient, whereas the laboratory HCMV strain Towne is PC-deficient, the difference in infection efficiency by TB40/E and Towne in human brain organoids suggests that efficient HCMV infection of human brain organoids is dependent on the PC.

Figure 4D:
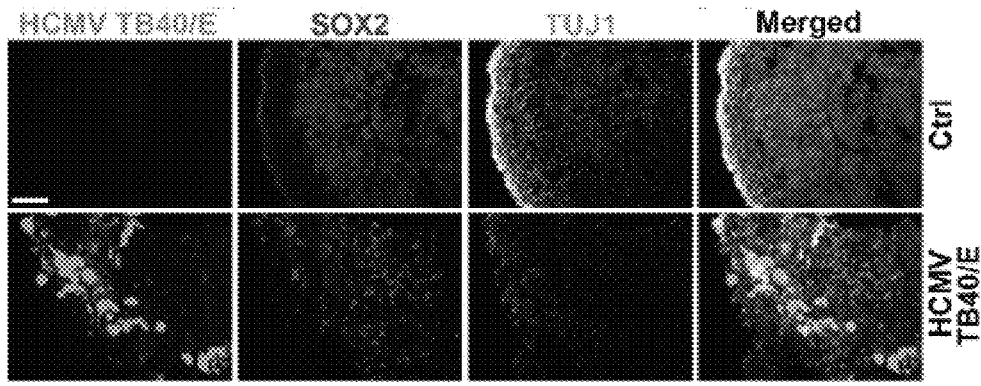
Figure 4E:
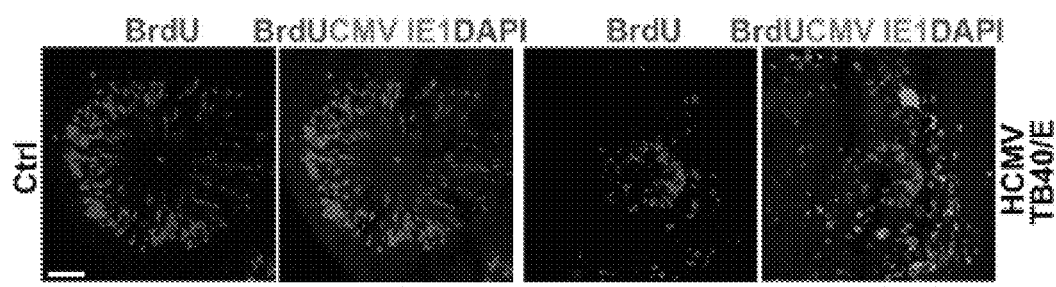
Figure 4F:
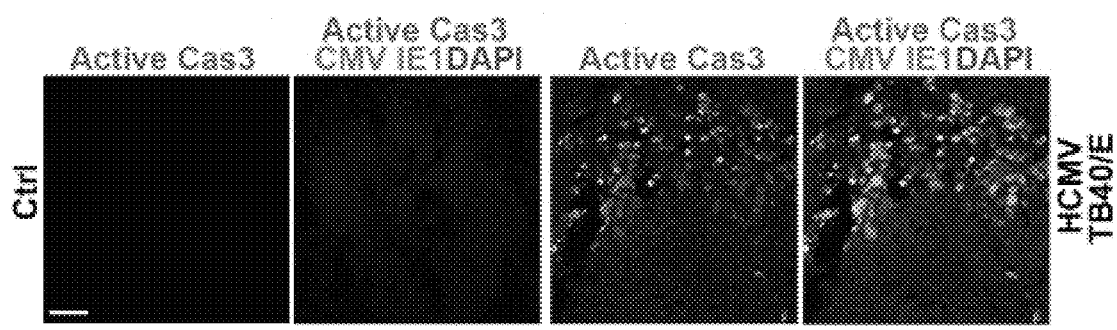

Further characterization of the mock-infected and TB40/E-infected brain organoids 15 days after infection revealed that TB40/E compromised the formation of the outer layer of the SOX2-positive progenitor core and the TUJ1-positive neuronal layer in human brain organoids (FIG. 4D), indicating that TB40/E impairs the formation of outer neural progenitor and cortical layers in the infected brain organoids. In addition, staining with the proliferative marker BrdU and the apoptotic marker active caspase 3 (Cas3) revealed a decrease in the number of proliferating cells and an increase in the number of apoptotic cells in TB40/E-infected brain organoids, when compared to the control organoids (FIGS. 3B, 3C, 4E, and 4F). In a parallel study, the hiPSC-derived brain organoids were infected with a non-GFP tagged virus variant of TB40/E, termed TB40/E-Gluc31. As with the GFP-tagged TB40/E, the non-GFP-tagged TB40/E-Gluc caused a decrease in the number of proliferating cells and an increase in apoptotic cells in infected organoids (FIGS. 3B-3E). These results together indicate that the "clinical-like" HCMV strain TB40/E can efficiently infect human brain organoids and impairs the growth and structure of hiPSC-derived brain organoids.

Example 3: NAbs Effectively Prevent HCMV TB40/E-Induced Abnormal Brain Organoid Growth and Structure Although NAbs are considered important for preventing congenital HCMV infection[32-35], their capacity to interfere with HCMV infection of the developing human brain remains unknown. To gain insight into the potential of NAbs to interfere with HCMV infection of human brain cells, the prevention of TB40/E infection of hiPSC-derived brain organoids was evaluated by two previously isolated NAbs, 1B2 and 62-11, that were raised in mice against the envelope PC by vaccination[36, 37]. NAb 1B2 is an antibody that targets the UL128/130/131A subunits of the PC. 1B2 is unable to prevent HCMV infection of fibroblasts, but confers exceptionally high potency to inhibit HCMV infection of epithelial cells[36]. In contrast, NAb 62-11 is a gH-specific antibody that can potently interfere with both fibroblast and epithelial cell infection[36, 37].

Figure 5A:
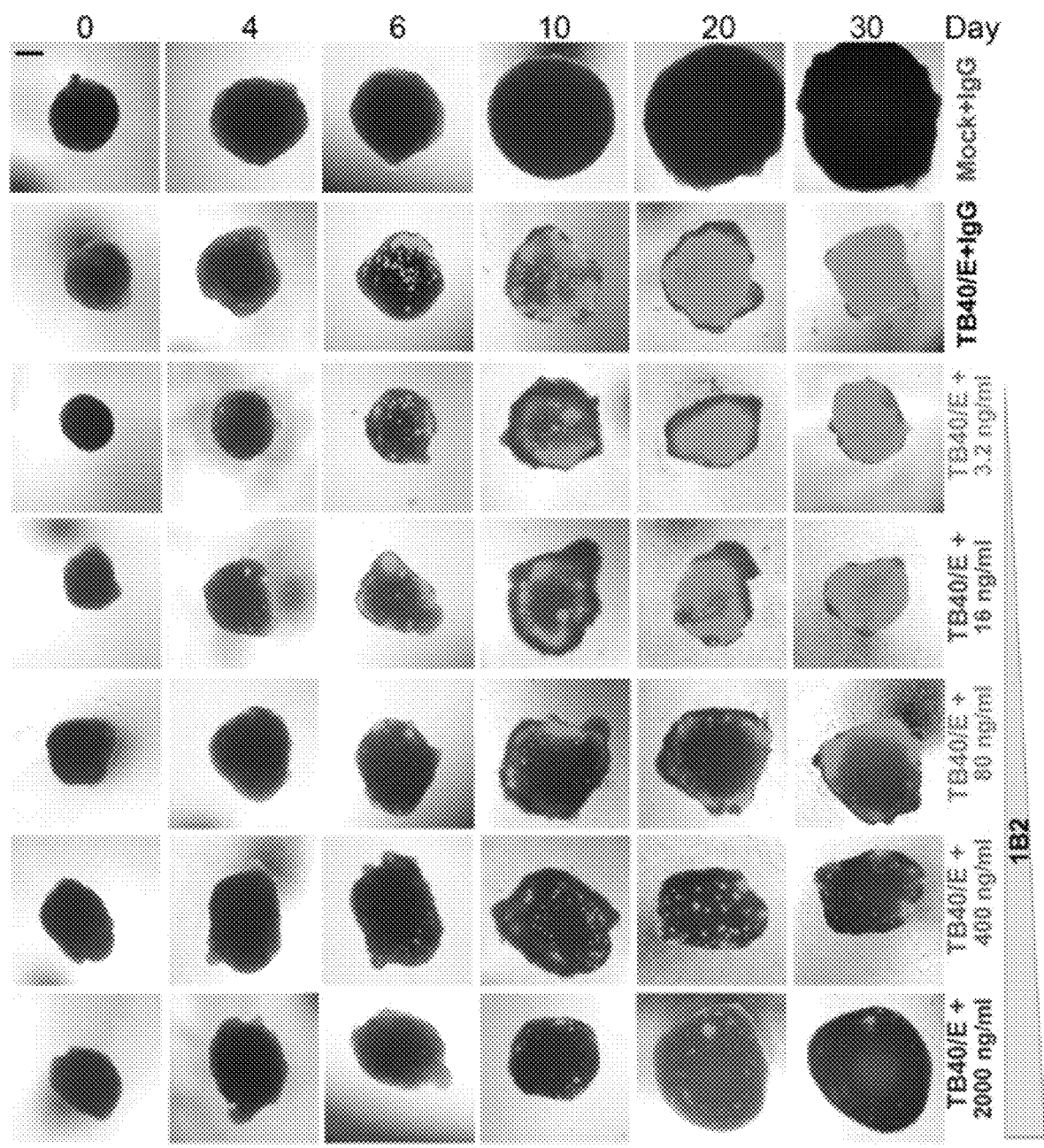
FIGS. 5A-5C show prevention of HCMV TB40/E-induced abnormal brain organoid growth by NAbs. hiPSC-derived brain organoids at day 45 of differentiation were infected with GFP-labeled TB40/E in the presence of different concentrations of NAb 11B2 that ranged from 3.2 ng/ml to 2000 ng/ml. Mock-infected and TB40/E-infected brain organoids in the presence of IgG control (2000 ng/ml) were used as controls.
Figure 5B:
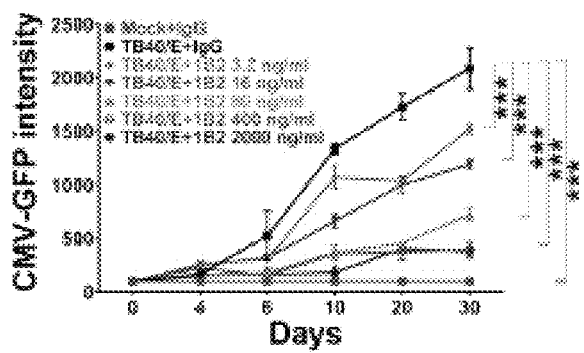
Figure 5C:
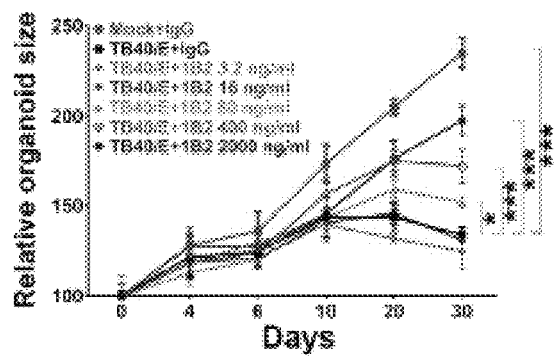
Figure 6A:
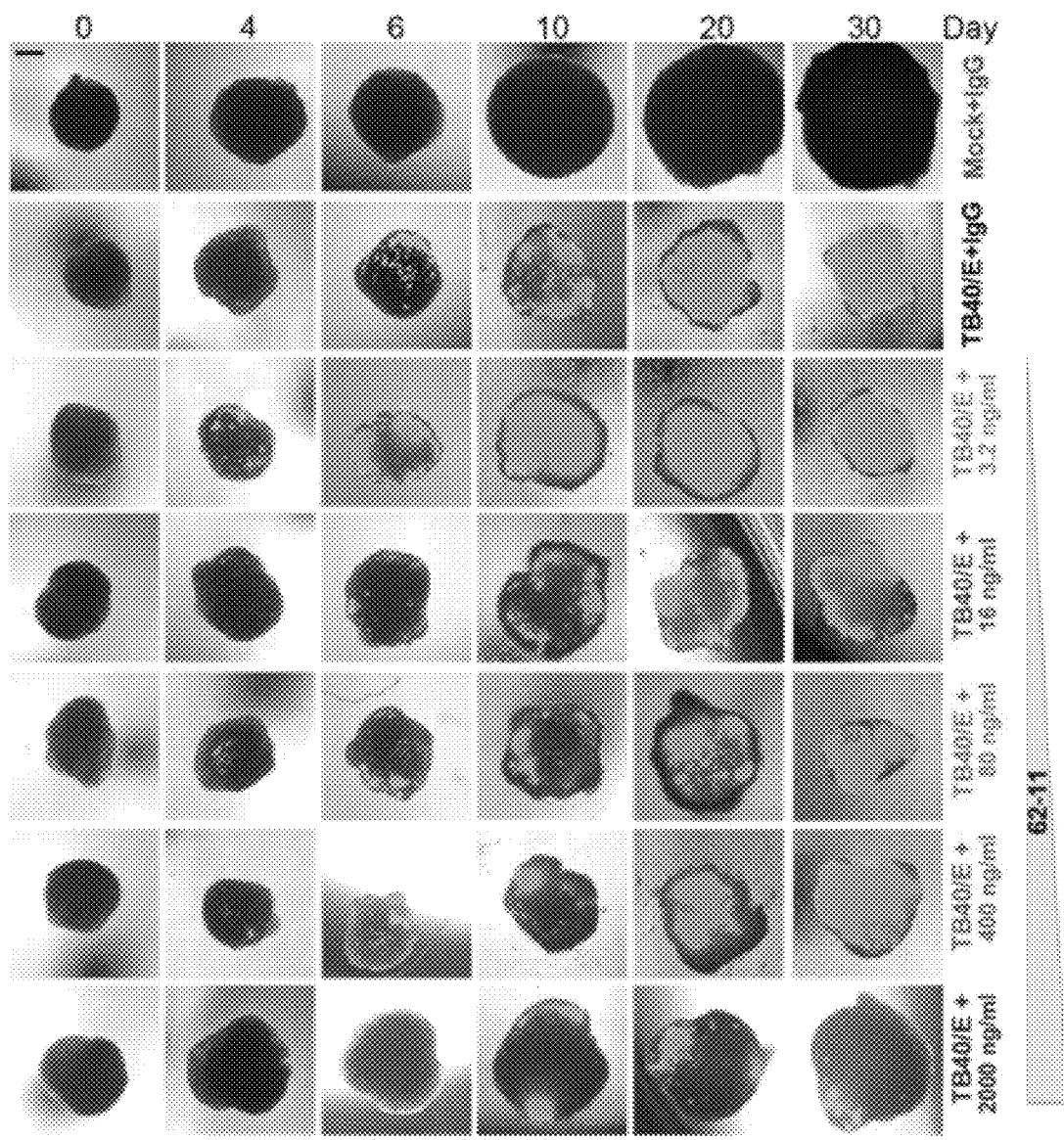
FIGS. 6A-6C show prevention of HCMV TB40/E-induced abnormal brain organoid growth by Nab 62-11. hiPSC-derived brain organoids at day 45 of differentiation were infected with GFP-labeled TB40/E in the presence of different concentrations of NAb 62-11 that ranged from 3.2 ng/ml to 2000 ng/ml of antibody. Mock-infected brain organoids and TB40/E-infected organoids treated with IgG control (2000 ng/ml) were used as control organoids.
Figure 6B:
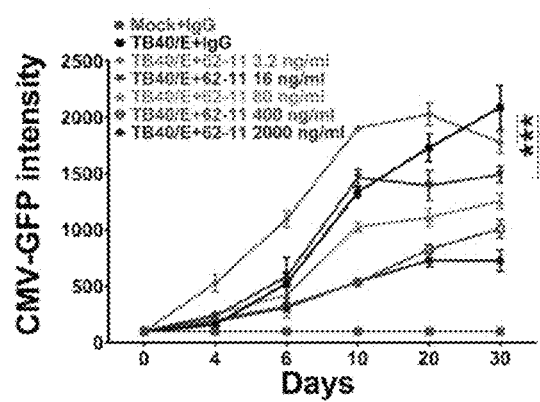
Figure 6C:
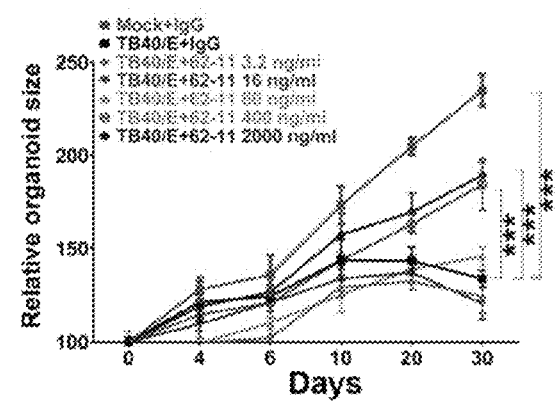
Figure 7A:
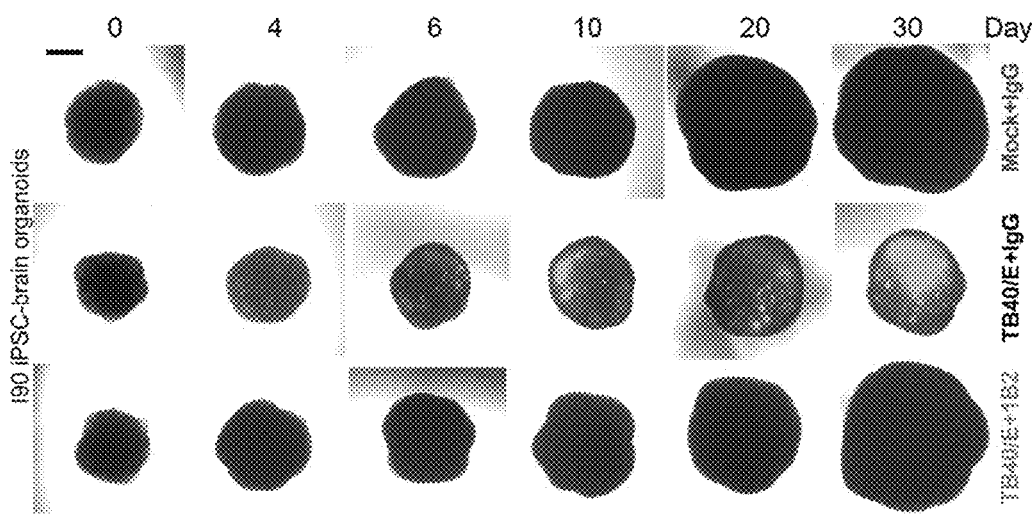
FIGS. 7A-7E show that NAb prevents abnormal brain organoid growth induced by TB40/E and TR in hiPSC-derived organoids. Human IMR90 iPSC-derived brain organoids at day 45 of differentiation were infected with GFP-labeled TB40/E or TR in the absence or presence of NAb. Mock-infected brain organoids were used as a control.
Figure 7B:
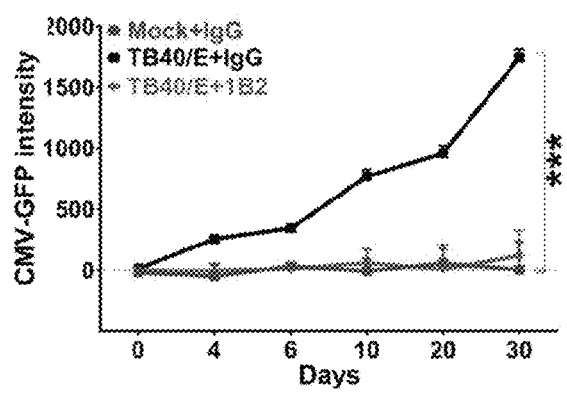
Figure 7C:
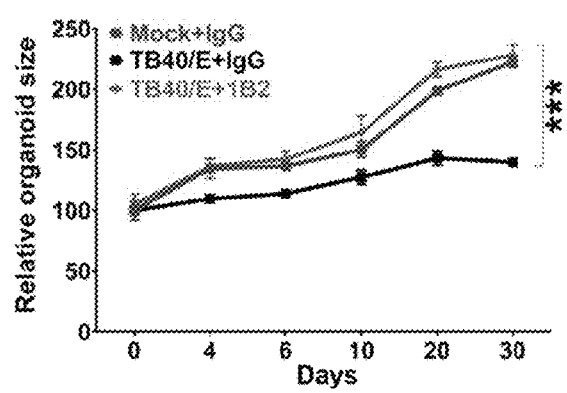
Figure 7D:
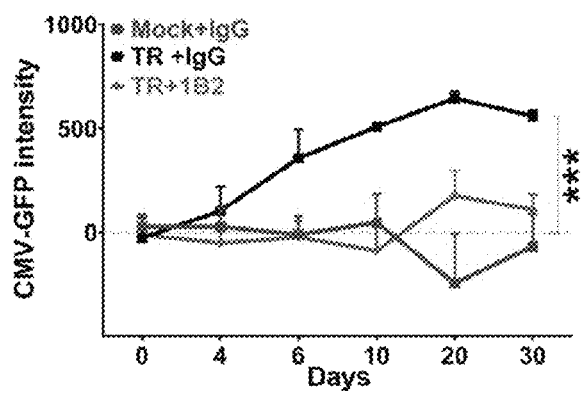
Figure 7E:
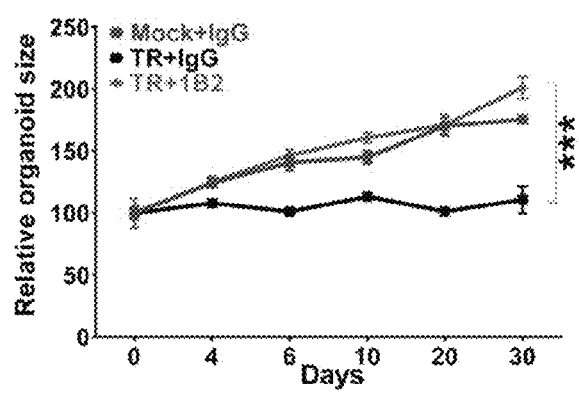

Using the GFP-labeled TB40/E virus, human brain organoids were infected at day 45 of differentiation in the presence of different concentrations of the 1B2 or 62-11 antibody (3.2-2000 ng/ml) and measured GFP fluorescence intensity and brain organoid size for up to 30 days post infection. Mock-infected and TB40/E-infected brain organoids treated with IgG control were used as control organoids. Compared to brain organoids infected with TB40/E in the presence of IgG control, organoids infected with TB40/E in the presence of either the 1B2 or 62-11 NAb exhibited substantially reduced GFP fluorescence intensity and markedly increased growth kinetics in a dose-dependent manner. More dramatic effects were observed with higher concentrations of the 1B2 or 62-11 NAb (FIGS. 5 and 6). Brain organoids infected with TB40/E in the presence of 80-2000 ng/ml of the 1B2 or 62-11 antibody were substantially larger than organoids infected with TB40/E in the presence of IgG control (FIGS. 5, 6, and 7A). To determine whether infection with other "clinical-like" HCMV strains besides TB40/E could also induce a microcephaly-like phenotype, the hiPSC-derived brain organoids were infected with another "clinical-like" HCMV strain, termed TR38. As observed with TB40/E, substantially reduced brain organoid size following infection with TR was found (FIGS. 7B-7E). Moreover, the infection of brain organoids by TR and its effect on brain organoid growth could be prevented by NAb 1B2 (FIGS. 7D, 7E). These results indicate that PC-specific NAbs can inhibit brain organoid infection by the "clinical-like" HCMV strains TB40/E and TR, thereby allowing normal brain organoid growth.

Figure 9A:
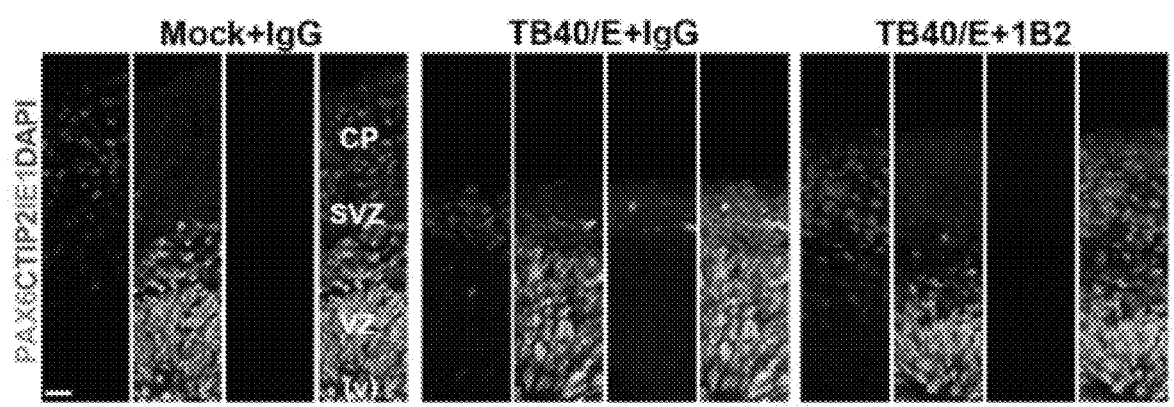
FIGS. 9A-9D show that NAb prevents TB40/E-induced abnormal layer composition in brain organoids.
Figure 9B:
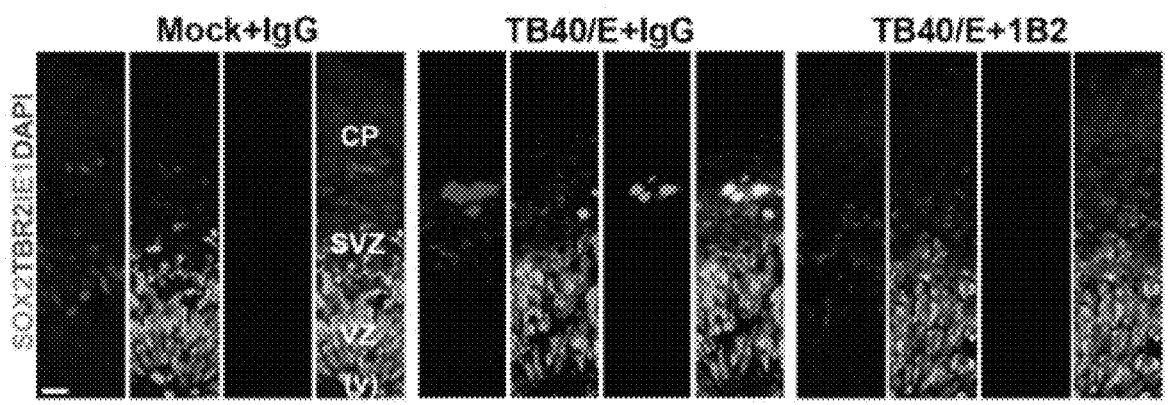
Figure 9C:
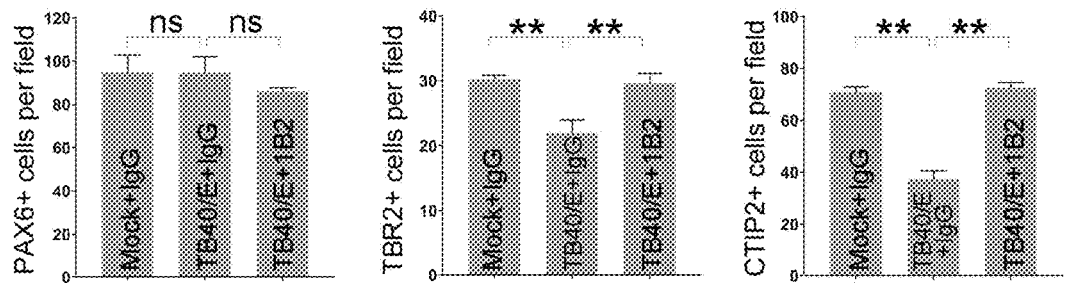
Figure 9D:
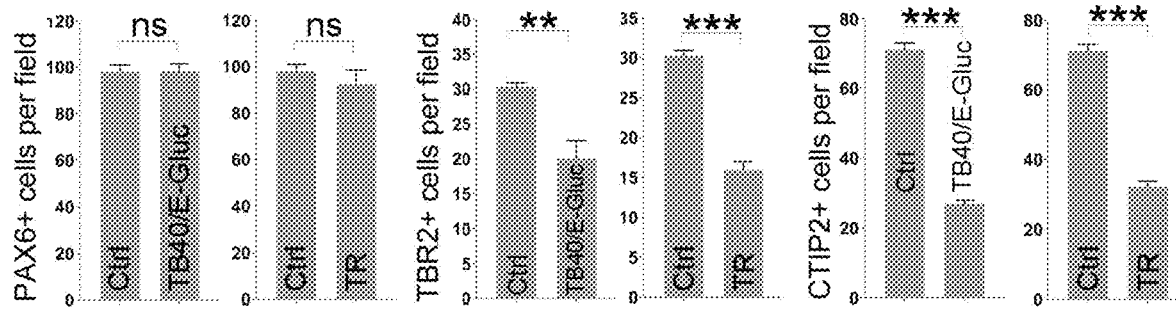

In addition to preventing brain organoid growth restriction by TB40/E, the NAb treatment also inhibited abnormal cortical structure formation induced by TB40/E. Cortical layers in brain organoids were defined by layer-specific marker staining (FIG. 8A). Immunostaining for HCMV immediate-early 1 (IE1) protein revealed that the HCMV-positive cells were predominantly found in the TBR2+SVZ (FIG. 8B). Accordingly, when compared to the mock-infected organoids treated with IgG control, the TB40/E-infected brain organoids treated with the IgG control displayed substantially reduced thickness of the TBR2+SVZ and the CTIP2+CP layers, while the PAX6+VZ layer was not considerably affected (FIGS. 8C, 8D, 8G). In contrast, the TBR2+SVZ and the CTIP2+CP layers in the brain organoids infected with TB40/E in the presence of the 11B2 antibody were much thicker than those in organoids treated with TB40/E in the presence of the IgG control, similar to those of the mock-infected brain organoids treated with the IgG control (FIGS. 8C, 8D, 8G). The number of the TBR2+ cells and the CTIP2+ cells in these organoids was changed accordingly (FIGS. 9A-9C). A similar effect on the TBR2+ and the CTIP2+ layer thickness was observed when brain organoids were infected with non-GFP-tagged TB40/E-Gluc or TR (FIG. 9D). Further characterization of the infected brain organoids with markers for cortical layer-specific neurons revealed reduced thicknesses of both deep and superficial cortical layers in organoids infected with TB40/E in the presence of IgG control when compared to mock-infected organoids treated with IgG control. In contrast, the cortical layers in the organoids infected with TB40/E in the presence of 1B2 NAb were similar to those of the mock-infected organoids treated with the IgG control (FIGS. 8E, 8F, 8H). These results together indicate that NAbs targeting the epitopes of HCMV PC can potently prevent HCMV infection of human brain organoids, thus allowing normal brain organoid growth and cortical layer formation.

Example 4: PDGFRα and EGFR are Involved in HCMV TB40/E Infection of Human Brain Organoids To support the relevance of the brain organoid model to study HCMV infection of the developing human brain, potential cellular receptors that are involved in brain organoid infection by TB40/E were investigated. Several receptors, such as platelet-derived growth factor receptor alpha (PDGFRα), epidermal growth factor receptor (EGFR), and integrins (α3, α5, and β3), have been previously described to be either directly or indirectly involved in HCMV host cell entry[39-41].

To determine the importance of these cellular receptors for brain organoid infection by TB40/E, the expression of individual receptors was knocked down using receptor-specific siRNAs. The knockdown efficiency of each receptor was verified in hiPSC-derived NPCs by qRT-PCR (FIG.

Figure 10A:
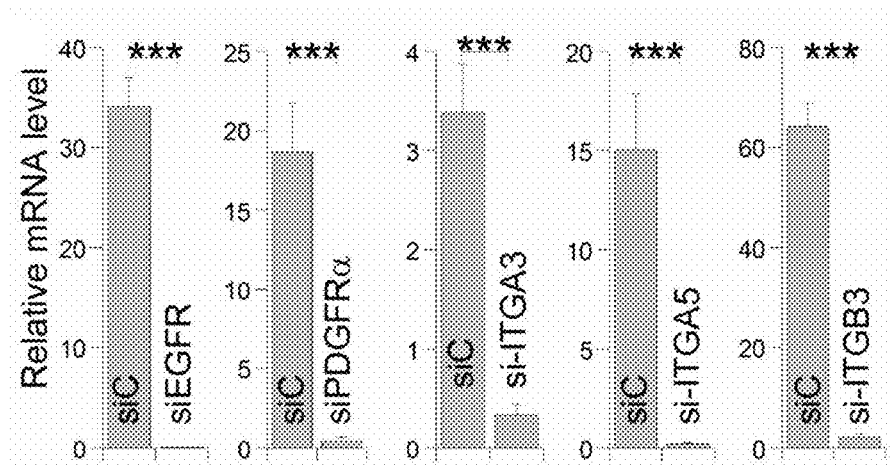
FIGS. 10A-10B show knockdown of receptor gene expression by receptor-specific siRNAs.
Figure 10B:
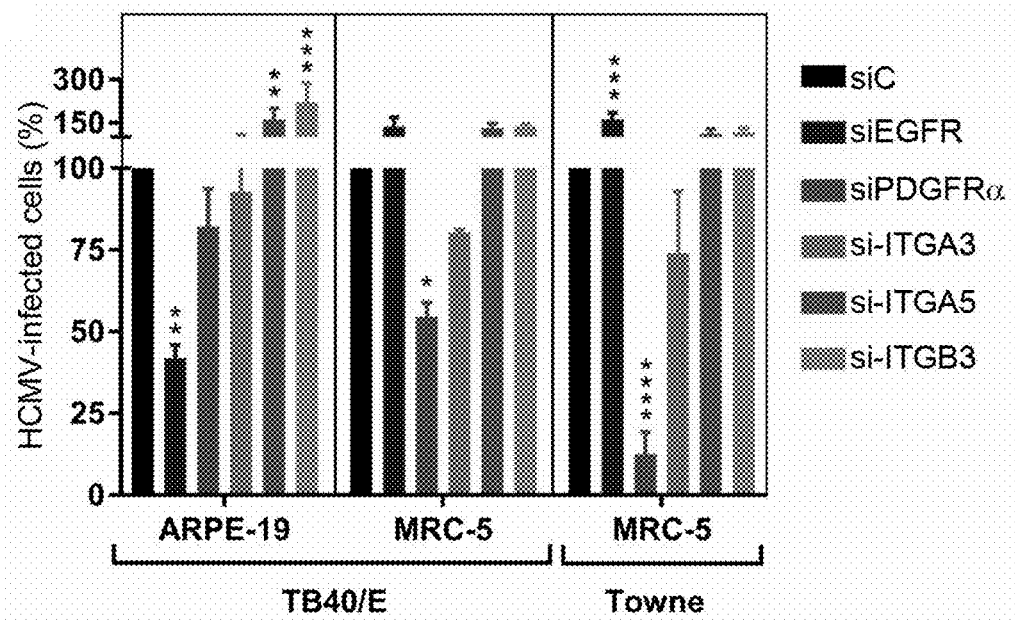
Figure 11A:
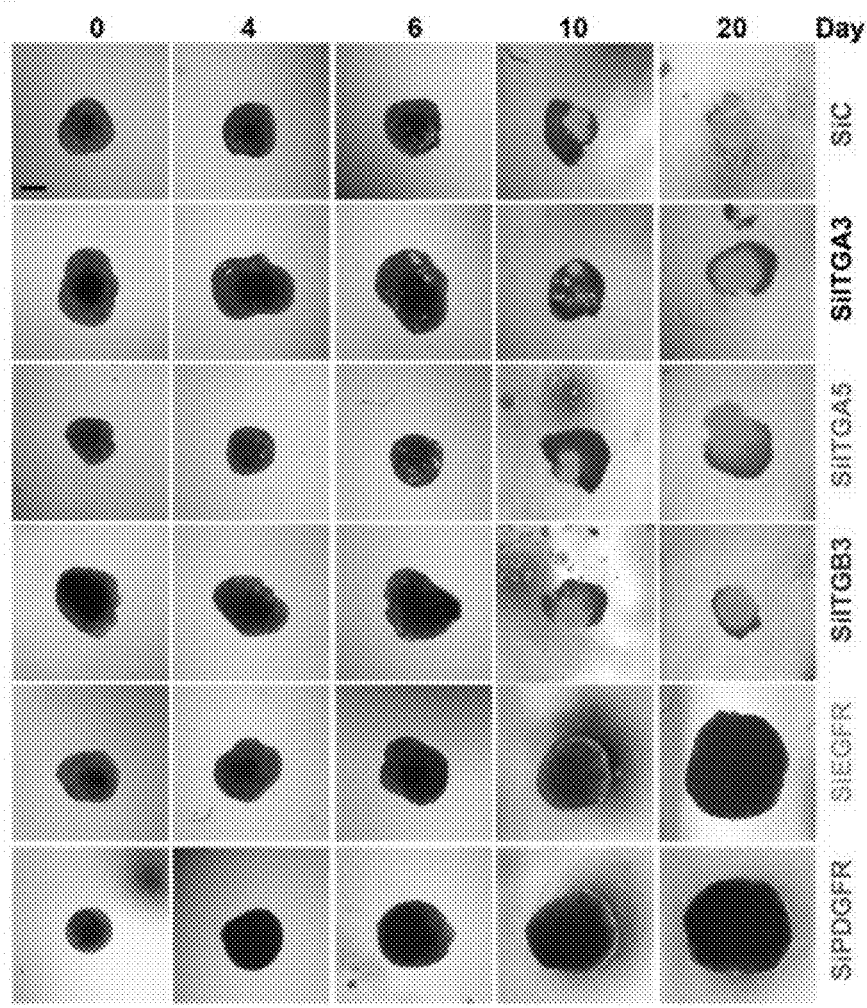

10A). The differential involvement of EGFR and PDGFRα in HCMV entry into epithelial cells and fibroblasts, respectively[42] was confirmed (FIG. 10B). Then hiPSC-derived brain organoids were treated at day 45 of differentiation with different receptor-specific siRNA or a control siRNA for 4 days and subsequently the organoids were exposed to the GFP-labeled HCMV TB40/E. Following HCMV exposure, the GFP fluorescence intensity and the brain organoid size was evaluated for up to 20 days. Brain organoids treated with the integrin α3 (ITGA3), α5 (ITGA5), or β3 (ITGB3)-specific siRNA exhibited similar GFP fluorescence intensity and growth kinetics to those of control siRNA-treated brain organoids (FIGS. 11A-11C). In contrast, brain organoids treated with the EGFR- or PDGFRα-specific siRNA showed no or very low GFP fluorescence during the entire 20-day post infection period and exhibited substantially higher growth kinetics compared to control siRNA-treated organoids (FIGS. 11A-11C). These results indicate that both PDGFRα and EGFR are involved in HCMV infection of the brain organoids. Western blot analysis revealed that both EGFR and PDGFRα were expressed at higher levels in NPCs than neurons (FIG. 11D). To support the importance of these receptors in HCMV infection, whether overexpression of these receptors in HCMV-resistant cells could render these cells susceptible to HCMV infection was evaluated. EGFR and PDGFRα expression vectors were prepared and their expression was confirmed by Western blot (FIG. 11E). Using these vectors, it was found that overexpression of EGFR and PDGFRα in hiPSCs, which are resistant to HCMV infection[43], rendered these cells permissive to TB40/E infection (FIG. 11F), indicating that both EGFR and PDGFRα are important mediators of HCMV infection. These results together indicate that HCMV infection of human brain organoids involves both EGFR and PDGFRα, whereas it does not appear to depend on integrins, such as α3, α5, or β3 integrin.

Figure 12A:
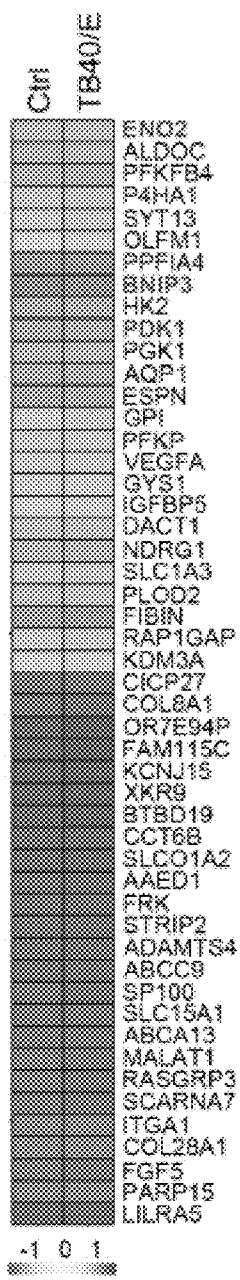
FIGS. 12A-12C show that calcium signaling is affected in HCMV-infected brain organoids. RNA sequencing analysis of control and TB40/E-infected brain organoids. Brain organoids at day 45 differentiation were infected with TB40/E and analyzed by RNA sequencing analysis 15 days post-infection.
Figure 12B:
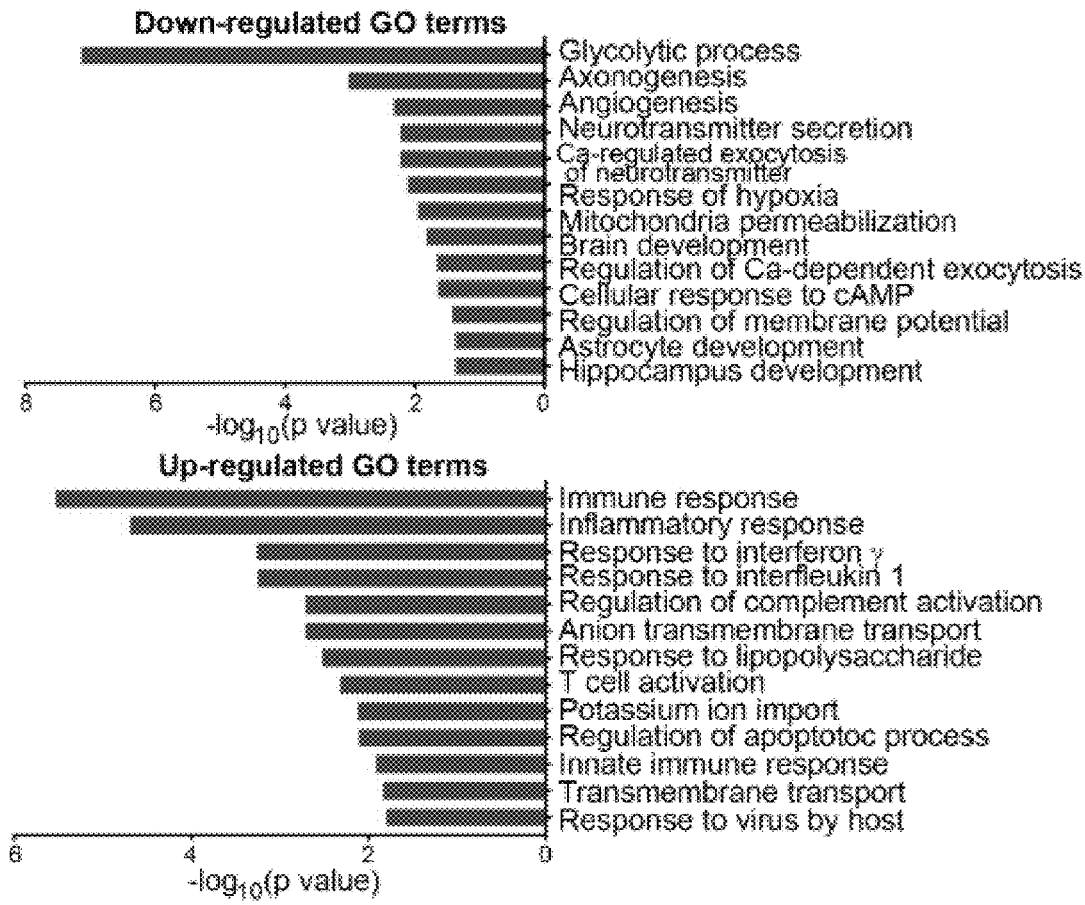
Figure 12C:
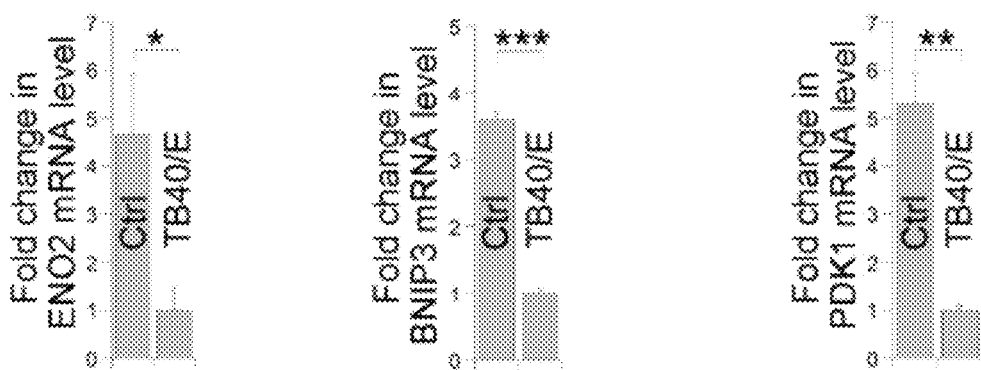

Example 5: HCMV TB40/E Disrupts Calcium Signaling and Neural Network Activity in Brain Organoids To uncover mechanisms of HCMV-induced neurodevelopmental defects, RNA sequencing analysis was performed in control and HCMV TB40/E-infected brain organoids. Interestingly, it was found that at least three out of the top ten down-regulated genes in HCMV TB40/E-infected organoids were related to calcium signaling (FIG. 12A). These genes include ENO2, a neuron-specific enolase that could bind to calcium44; BNIP3, a gene involved in ER/mitochondria $Ca^{2+}$ homeostasis[45]; and PDK1, a gene involved in regulation of $Ca^{2+}$ entry into cells[46] (FIG. 12A). Gene ontology (GO) analysis revealed that genes significantly down-regulated in TB40/E-infected brain organoids include those involved in neurodevelopment, including brain development, astrocyte development, and hippocampal development, and genes implicated in calcium-regulated exocytosis of neurotransmitter and regulation of calcium-dependent exocytosis (FIG. 12B). On the other hand, genes significantly up-regulated in TB40/E-infected brain organoids include those involved in immune response and inflammatory response (FIG. 12B). RT-qPCR analysis confirmed decreased expression of ENO2, BNIP3 and PDK1, three calcium signaling-related genes, in TB40/E-infected brain organoids (FIG. 12C).

Figure 13A:
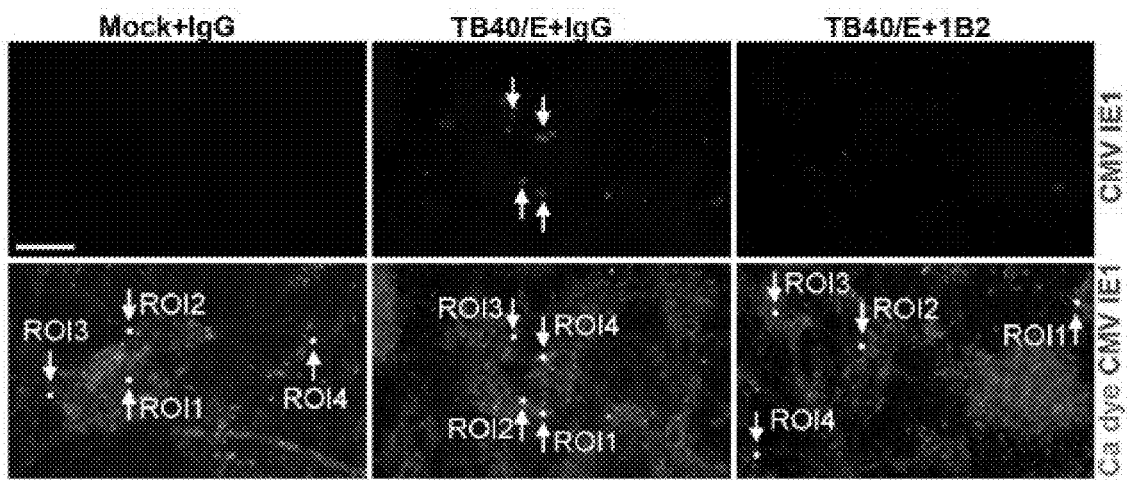
FIGS. 13A-13D show that HCMV infection disrupts calcium signaling and neural network activity in brain organoids.
Figure 13B:
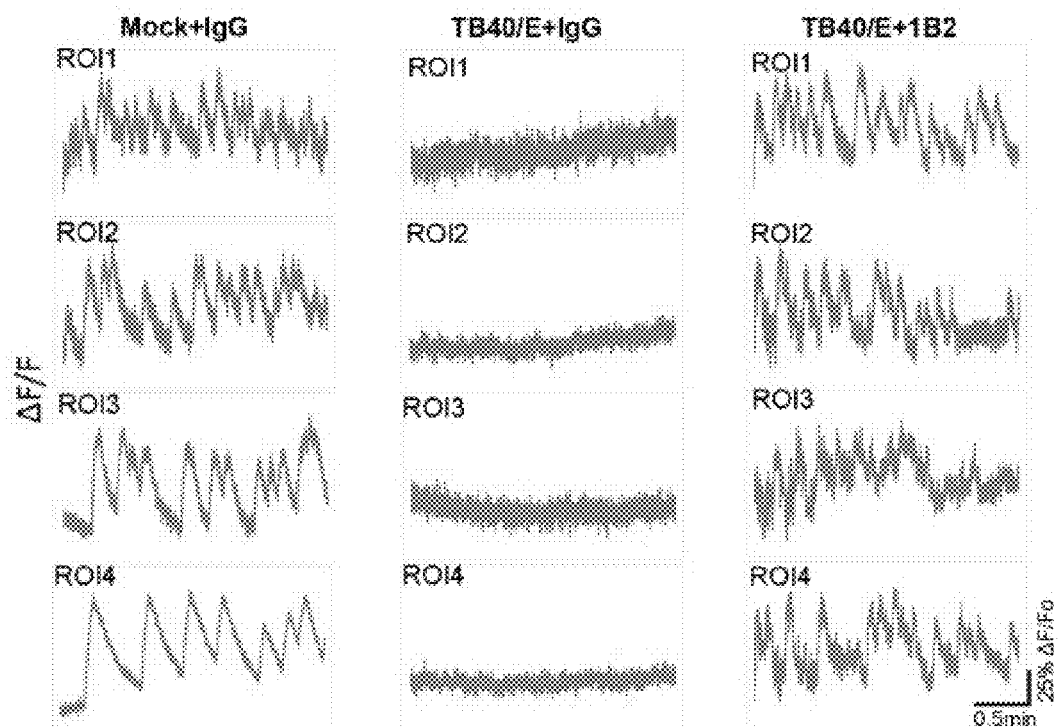

The downregulation of genes involved in calcium signaling in TB40/E-treated brain organoids led to the test whether calcium response is impaired in HCMV-infected organoids. Using calcium imaging, $Ca^{2+}$ oscillations in control brain organoids and TB40/E-treated brain organoids were measured, as well as brain organoids infected with TB40/E in the presence of 1B2 NAb. Because the calcium signal was monitored using a green fluorescent calcium dye, TB40/E virus without a GFP reporter was used to infect human brain organoids, and the HCMV-infected cells were detected by immunostaining for the HCMV IE1 protein. While control brain organoids exhibited frequent bursts of calcium surges, no calcium activity was detected in HCMV-positive regions (identified by IE1+ staining) in HCMV-infected brain organoids (FIGS. 13A, 13B). In contrast, the brain organoids infected with TB40/E in the presence of 1B2 NAb displayed bursts of calcium surges that were in frequency and magnitude similar to those of the control organoids (FIGS. 13A, 13B). These results indicate that HCMV TB40/E abrogates calcium signaling in infected brain organoids, which can be prevented by anti-HCMV PC NAbs.

Figure 13C:
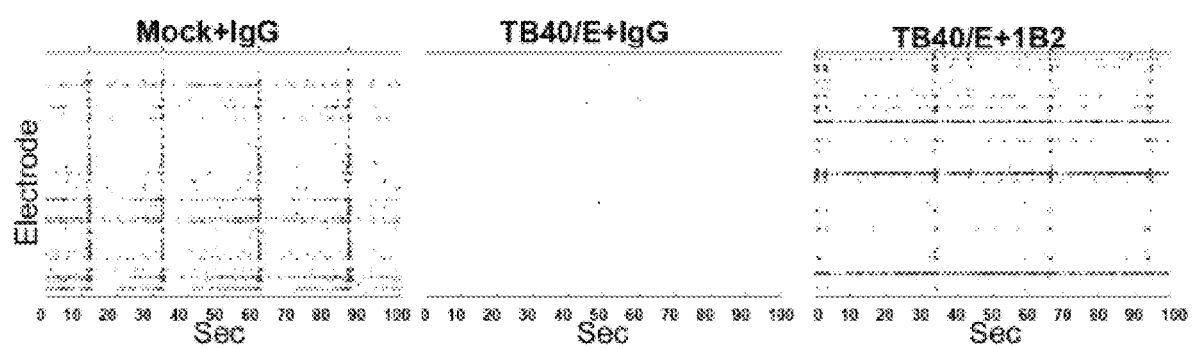
Figure 13D:
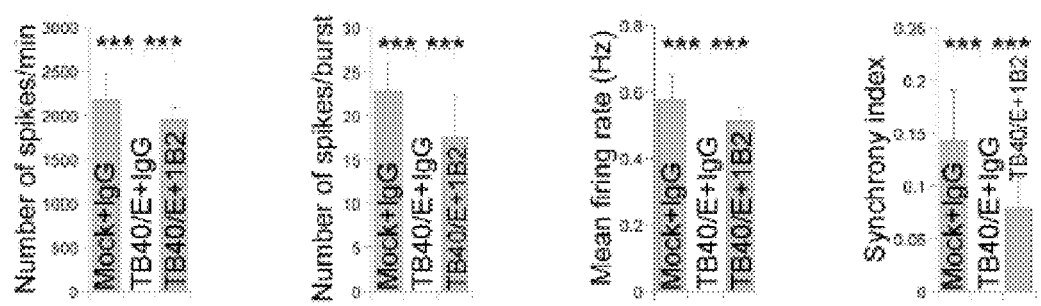
Figure 14:
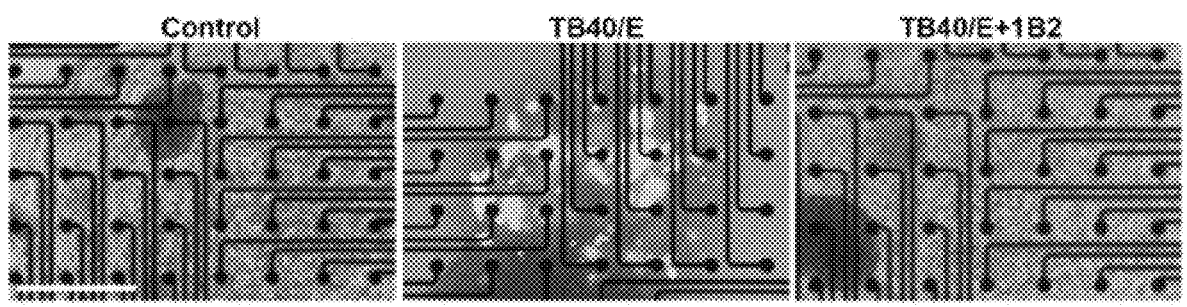
FIG. 14 shows representative images of brain organoids seeded on MEA electrodes. Sample images of mock-infected brain organoids and brain organoids infected with GFP-tagged TB40/E in the absence or presence of 1B2 NAb are shown. Scale: 500 µm.

In addition to measuring neural activity using calcium imaging, neural network activity in TB40/E-infected brain organoids was evaluated by MEA (FIG. 14). Multiple synchronized bursts and spikes were detected by MEA recording in control brain organoids (FIGS. 13C, 13D). In contrast, TB40/E-infected brain organoids displayed significantly reduced neural network activity, including reduced number of spikes, mean firing rate, and synchrony index (FIGS. 13C, 13D). Consistent with the finding from calcium imaging, treatment with the 1B2 NAb largely prevented neural network impairment induced by TB40/E, resulting in an MEA profile similar to that of the control brain organoids (FIGS. 13C, 13D). These results together indicate that HCMV can severely impair neural network activity in infected brain organoids, which can be largely prevented by the treatment with a HCMV PC-specific NAbs.

REFERENCES

The references, patents and published patent applications listed below, and all references cited in the specification above are hereby incorporated by reference in their entirety, as if fully set forth herein.

1 Britt, W. (2008). Manifestations of human cytomegalovirus infection: proposed mechanisms of acute and chronic disease. Curr. Top. Microbiol. Immunol. 325, 417-470.

2 Cheeran, M. C., Lokensgard, J. R. & Schleiss, M. R. (2009). Neuropathogenesis of congenital cytomegalovirus infection: disease mechanisms and prospects for intervention. Clin. Microbiol. Rev. 22, 99-126, Table of Contents, doi:10.1128/CMR.00023-08.

3 Britt, W. J. (2017). Congenital Human Cytomegalovirus Infection and the Enigma of Maternal Immunity. J. Virol. 91, doi:10.1128/JVI.02392-16.

4 Boppana, S. B., Rivera, L. B., Fowler, K. B., Mach, M. & Britt, W. J. (2001). Intrauterine transmission of cytomegalovirus to infants of women with preconceptional immunity. N. Engl. J. Med. 344, 1366-1371, doi:10.1056/NEJM200105033441804.

5 Kenneson, A. & Cannon, M. J. (2007). Review and meta-analysis of the epidemiology of congenital cytomegalovirus (CMV) infection. Rev. Med. Virol. 17, 253-276, doi:10.1002/rmv.535.

6 Lanzieri, T. M., Dollard, S. C., Bialek, S. R. & Grosse, S. D. (2014). Systematic review of the birth prevalence of congenital cytomegalovirus infection in developing countries. Int. J. Infect. Dis. 22, 44-48, doi:10.1016/j.ijid.2013.12.010.

7. Wang, C., Zhang, X., Bialek, S. & Cannon, M. J. (2011). Attribution of congenital cytomegalovirus infection to primary versus non-primary maternal infection. Clin. Infect. Dis. 52, e11-13, doi:10.1093/cid/ciq085.
8. Teissier, N., Fallet-Bianco, C., Delezoide, A. L., Laqueriere, A., Marcorelles, P., Khung-Savatovsky, S., Nardelli, J., Cipriani, S., Csaba, Z., Picone, O. et al. (2014). Cytomegalovirus-induced brain malformations in fetuses. Journal of neuropathology and experimental neurology 73, 143-158, doi:10.1097/NEN.0000000000000038.
9. Cannon, M. J. & Davis, K. F. (2005). Washing our hands of the congenital cytomegalovirus disease epidemic. BMC Public Health 5, 70, doi:10.1186/1471-2458-5-70.
10. Kawasaki, H., Kosugi, I., Meguro, S. & Iwashita, T. (2017). Pathogenesis of developmental anomalies of the central nervous system induced by congenital cytomegalovirus infection. Pathology international 67, 72-82, doi:10.1111/pin.12502.
11. Taverna, E., Gotz, M. & Huttner, W. B. (2014). The cell biology of neurogenesis: toward an understanding of the development and evolution of the neocortex. Annual review of cell and developmental biology 30, 465-502, doi:10.1146/annurev-cellbio-101011-155801.
12. Di Lullo, E. & Kriegstein, A. R. (2017). The use of brain organoids to investigate neural development and disease. Nature reviews 18, 573-584, doi:10.1038/nrn.2017.107.
13. Lancaster, M. A. & Knoblich, J. A. (2014). Organogenesis in a dish: modeling development and disease using organoid technologies. Science (New York, N.Y 345, 1247125.
14. Qian, X., Nguyen, H. N., Song, M. M., Hadiono, C., Ogden, S. C., Hammack, C., Yao, B., Hamersky, G. R., Jacob, F., Zhong, C. et al. (2016). Brain-Region-Specific Organoids Using Mini-bioreactors for Modeling ZIKV Exposure. Cell 165, 1238-1254.
15. Lancaster, M. A. & Knoblich, J. A. (2014). Generation of cerebral organoids from human pluripotent stem cells. Nature protocols 9, 2329-2340, doi:10.1038/nprot.2014.158.
16. Petersen, L. R., Jamieson, D. J., Powers, A. M. & Honein, M. A. (2016). Zika Virus. N. Engl. J. Med. 374, 1552-1563, doi:10.1056/NEJMra1602113.
17. Cugola, F. R., Fernandes, I. R., Russo, F. B., Freitas, B. C., Dias, J. L., Guimaraes, K. P., Benazzato, C., Almeida, N., Pignatari, G. C., Romero, S. et al. (2016). The Brazilian Zika virus strain causes birth defects in experimental models. Nature 534, 267-271.
18. Lancaster, M. A., Renner, M., Martin, C. A., Wenzel, D., Bicknell, L. S., Hurles, M. E., Homfray, T., Penninger, J. M., Jackson, A. P. & Knoblich, J. A. (2013). Cerebral organoids model human brain development and microcephaly. Nature 501, 373-379, doi:10.1038/nature12517.
19. Kelava, I. & Lancaster, M. A. (2016). Dishing out mini-brains: Current progress and future prospects in brain organoid research. Developmental biology 420, 199-209, doi:10.1016/j.ydbio.2016.06.037.
20. Li, W., Sun, G., Yang, S., Qu, Q., Nakashima, K. & Shi, Y. (2008). Nuclear Receptor TLX Regulates Cell Cycle Progression in Neural Stem Cells of the Developing Brain. Molecular endocrinology (Baltimore, Md 22, 56-64.
21. Mora-Bermudez, F., Badsha, F., Kanton, S., Camp, J. G., Vernot, B., Kohler, K., Voigt, B., Okita, K., Maricic, T., He, Z. et al. (2016). Differences and similarities between human and chimpanzee neural progenitors during cerebral cortex development. eLife 5, doi:10.7554/eLife.18683.
22. Turrigiano, G. G., Leslie, K. R., Desai, N. S., Rutherford, L. C. & Nelson, S. B. (1998). Activity-dependent scaling of quantal amplitude in neocortical neurons. Nature 391, 892-896, doi:10.1038/36103.
23. Molyneaux, B. J., Arlotta, P., Menezes, J. R. & Macklis, J. D. (2007). Neuronal subtype specification in the cerebral cortex. Nature reviews. Neuroscience 8, 427-437, doi:10.1038/nrn2151.
24. Gaspard, N., Bouschet, T., Hourez, R., Dimidschstein, J., Naeije, G., van den Ameele, J., Espuny-Camacho, I., Herpoel, A., Passante, L., Schiffmann, S. N. et al. (2008). An intrinsic mechanism of corticogenesis from embryonic stem cells. Nature 455, 351-357, doi:10.1038/nature07287.
25. O'Connor, C. M. & Murphy, E. A. (2012). A myeloid progenitor cell line capable of supporting human cytomegalovirus latency and reactivation, resulting in infectious progeny. J. Virol. 86, 9854-9865, doi:10.1128/JVI.01278-12.
26. Cherrington, J. M. & Mocarski, E. S. (1989). Human cytomegalovirus ie1 transactivates the alpha promoter-enhancer via an 18-base-pair repeat element. J. Virol. 63, 1435-1440.
27. Hahn, G., Revello, M. G., Patrone, M., Percivalle, E., Campanini, G., Sarasini, A., Wagner, M., Gallina, A., Milanesi, G., Koszinowski, U. et al. (2004). Human cytomegalovirus UL131-128 genes are indispensable for virus growth in endothelial cells and virus transfer to leukocytes. J. Virol. 78, 10023-10033, doi:10.1128/JVI.78.18.10023-10033.2004.
28. Wang, D. & Shenk, T. (2005). Human cytomegalovirus virion protein complex required for epithelial and endothelial cell tropism. Proc. Natl. Acad. Sci. U.S.A 102, 18153-18158, doi:10.1073/pnas.0509201102.
29. Ryckman, B. J., Rainish, B. L., Chase, M. C., Borton, J. A., Nelson, J. A., Jarvis, M. A. & Johnson, D. C. (2008). Characterization of the human cytomegalovirus gH/gL/UL128-131 complex that mediates entry into epithelial and endothelial cells. J. Virol. 82, 60-70, doi:10.1128/JVI.01910-07.
30. Wussow, F., Chiuppesi, F., Contreras, H. & Diamond, D. J. (2017). Neutralization of Human Cytomegalovirus Entry into Fibroblasts and Epithelial Cells. Vaccines 5, doi:10.3390/vaccines5040039.
31. Falk, J. J., Laib Sampaio, K., Stegmann, C., Lieber, D., Kropff, B., Mach, M. & Sinzger, C. (2016). Generation of a *Gaussia* luciferase-expressing endotheliotropic cytomegalovirus for screening approaches and mutant analyses. Journal of virological methods 235, 182-189, doi:10.1016/j.jviromet.2016.06.008.
32. Nigro, G., Adler, S. P., La Torre, R. & Best, A. M. (2005). Passive immunization during pregnancy for congenital cytomegalovirus infection. N. Engl. J. Med. 353, 1350-1362, doi:10.1056/NEJMoa043337.
33. Lilleri, D., Kabanova, A., Lanzavecchia, A. & Gerna, G. (2012). Antibodies against neutralization epitopes of human cytomegalovirus gH/gL/pUL128-130-131 complex and virus spreading may correlate with virus control in vivo. J. Clin. Immunol. 32, 1324-1331, doi:10.1007/s10875-012-9739-3.
34. Lilleri, D., Kabanova, A., Revello, M. G., Percivalle, E., Sarasini, A., Genini, E., Sallusto, F., Lanzavecchia, A., Corti, D. & Gerna, G. (2013). Fetal human cytomegalovirus transmission correlates with delayed maternal antibodies to gH/gL/pUL128-130-131 complex during primary infection. PloS one 8, e59863, doi:10.1371/journal.pone.0059863.

35 Boppana, S. B. & Britt, W. J. (1995). Antiviral antibody responses and intrauterine transmission after primary maternal cytomegalovirus infection. The Journal of infectious diseases 171, 1115-1121.

36 Chiuppesi, F., Wussow, F., Johnson, E., Bian, C., Zhuo, M., Rajakumar, A., Barry, P. A., Britt, W. J., Chakraborty, R. & Diamond, D. J. (2015). Vaccine-Derived Neutralizing Antibodies to the Human Cytomegalovirus gH/gL Pentamer Potently Block Primary Cytotrophoblast Infection. J. Virol. 89, 11884-11898, doi:10.1128/JVI.01701-15.

37 Wussow, F., Chiuppesi, F., Martinez, J., Campo, J., Johnson, E., Flechsig, C., Newell, M., Tran, E., Ortiz, J., La Rosa, C. et al. (2014). Human cytomegalovirus vaccine based on the envelope gH/gL pentamer complex. PLoS Pathog. 10, e1004524, doi:10.1371/journal.ppat.1004524.

38 Murphy, E., Yu, D., Grimwood, J., Schmutz, J., Dickson, M., Jarvis, M. A., Hahn, G., Nelson, J. A., Myers, R. M. & Shenk, T. E. (2003). Coding potential of laboratory and clinical strains of human cytomegalovirus. Proc. Natl. Acad. Sci. U.S.A 100, 14976-14981, doi:10.1073/pnas.2136652100.

39 Soroceanu, L., Akhavan, A. & Cobbs, C. S. (2008). Platelet-derived growth factor-alpha receptor activation is required for human cytomegalovirus infection. Nature 455, 391-395, doi:10.1038/nature07209.

40 Wang, X., Huong, S. M., Chiu, M. L., Raab-Traub, N. & Huang, E. S. (2003). Epidermal growth factor receptor is a cellular receptor for human cytomegalovirus. Nature 424, 456-461, doi:10.1038/nature01818.

41 Feire, A. L., Koss, H. & Compton, T. (2004). Cellular integrins function as entry receptors for human cytomegalovirus via a highly conserved disintegrin-like domain. Proceedings of the National Academy of Sciences of the United States of America 101, 15470-15475, doi:10.1073/pnas.0406821101.

42 Kabanova, A., Marcandalli, J., Zhou, T., Bianchi, S., Baxa, U., Tsybovsky, Y., Lilleri, D., Silacci-Fregni, C., Foglierini, M., Fernandez-Rodriguez, B. M. et al. (2016). Platelet-derived growth factor-alpha receptor is the cellular receptor for human cytomegalovirus gHgLgO trimer. Nat. Microbiol. 1, 16082, doi:10.1038/nmicrobiol.2016.82.

43 D'Aiuto, L., Di Maio, R., Heath, B., Raimondi, G., Milosevic, J., Watson, A. M., Bamne, M., Parks, W. T., Yang, L., Lin, B. et al. (2012). Human induced pluripotent stem cell-derived models to investigate human cytomegalovirus infection in neural cells. PloS one 7, e49700, doi:10.1371/journal.pone.0049700.

44 Qin, J., Chai, G., Brewer, J. M., Lovelace, L. L. & Lebioda, L. (2006). Fluoride inhibition of enolase: crystal structure and thermodynamics. Biochemistry 45, 793-800, doi:10.1021/bi051558s.

45 Chaanine, A. H., Gordon, R. E., Kohlbrenner, E., Benard, L., Jeong, D. & Hajjar, R. J. (2013). Potential role of BNIP3 in cardiac remodeling, myocardial stiffness, and endoplasmic reticulum: mitochondrial calcium homeostasis in diastolic and systolic heart failure. Circulation. Heart failure 6, 572-583, doi:10.1161/CIRCHEARTFAILURE.112.000200.

46 Shumilina, E., Zemtsova, I. M., Heise, N., Schmid, E., Eichenmuller, M., Tyan, L., Rexhepaj, R. & Lang, F. (2010). Phosphoinositide-dependent kinase PDK1 in the regulation of Ca2+ entry into mast cells. Cellular physiology and biochemistry: international journal of experimental cellular physiology, biochemistry, and pharmacology 26, 699-706, doi:10.1159/000322337.

47 Gerna, G., Revello, M. G., Baldanti, F., Percivalle, E. & Lilleri, D. (2017). The pentameric complex of human Cytomegalovirus: cell tropism, virus dissemination, immune response and vaccine development. The Journal of general virology 98, 2215-2234, doi:10.1099/jgv.0.000882.

48 Brown, R. M., Rana, P., Jaeger, H. K., O'Dowd, J. M., Balemba, O. B. & Fortunato, E. A. (2019). Human Cytomegalovirus Compromises Development of Cerebral Organoids. Journal of virology 93, doi:10.1128/JVI.00957-19.

49 Sison, S. L., O'Brien, B. S., Johnson, A. J., Seminary, E. R., Terhune, S. S. & Ebert, A. D. (2019). Human Cytomegalovirus Disruption of Calcium Signaling in Neural Progenitor Cells and Organoids. Journal of virology 93, doi:10.1128/JVI.00954-19.

50 Manicklal, S., Emery, V. C., Lazzarotto, T., Boppana, S. B. & Gupta, R. K. (2013). The "silent" global burden of congenital cytomegalovirus. Clin. Microbiol. Rev. 26, 86-102, doi:10.1128/CMR.00062-12.

51 Kwak, M., Yum, M. S., Yeh, H. R., Kim, H. J. & Ko, T. S. (2018). Brain Magnetic Resonance Imaging Findings of Congenital Cytomegalovirus Infection as a Prognostic Factor for Neurological Outcome. Pediatr Neurol 83, 14-18, doi:10.1016/j.pediatrneurol.2018.03.008.

52 Kabanova, A., Marcandalli, J., Zhou, T., Bianchi, S., Baxa, U., Tsybovsky, Y., Lilleri, D., Silacci-Fregni, C., Foglierini, M., Fernandez-Rodriguez, B. M. et al. (2016). Platelet-derived growth factor-alpha receptor is the cellular receptor for human cytomegalovirus gHgLgO trimer. Nature microbiology 1, 16082, doi:10.1038/nmicrobiol.2016.82.

53 Ciferri, C., Chandramouli, S., Donnarumma, D., Nikitin, P. A., Cianfrocco, M. A., Gerrein, R., Feire, A. L., Barnett, S. W., Lilja, A. E., Rappuoli, R. et al. (2015). Structural and biochemical studies of HCMV gH/gL/gO and Pentamer reveal mutually exclusive cell entry complexes. Proc. Natl. Acad. Sci. U.S.A 112, 1767-1772, doi:10.1073/pnas.1424818112.

54 Wu, Y., Prager, A., Boos, S., Resch, M., Brizic, I., Mach, M., Wildner, S., Scrivano, L. & Adler, B. (2017). Human cytomegalovirus glycoprotein complex gH/gL/gO uses PDGFR-alpha as a key for entry. PLoS Pathog. 13, e1006281, doi:10.1371/journal.ppat.1006281.

55 Martinez-Martin, N., Marcandalli, J., Huang, C. S., Arthur, C. P., Perotti, M., Foglierini, M., Ho, H., Dosey, A. M., Shriver, S., Payandeh, J. et al. (2018). An Unbiased Screen for Human Cytomegalovirus Identifies Neuropilin-2 as a Central Viral Receptor. Cell, doi:10.1016/j.cell.2018.06.028.

56 Ryckman, B. J., Chase, M. C. & Johnson, D. C. (2008). HCMV gH/gL/UL128-131 interferes with virus entry into epithelial cells: evidence for cell type-specific receptors. Proc. Natl. Acad. Sci. U.S.A 105, 14118-14123, doi:10.1073/pnas.0804365105.

57 Kabanova, A., Perez, L., Lilleri, D., Marcandalli, J., Agatic, G., Becattini, S., Preite, S., Fuschillo, D., Percivalle, E., Sallusto, F. et al. (2014). Antibody-driven design of a human cytomegalovirus gHgLpUL128L subunit vaccine that selectively elicits potent neutralizing antibodies. Proc. Natl. Acad. Sci. U.S.A 111, 17965-17970, doi:10.1073/pnas.1415310111.

58 Zydek, M., Petitt, M., Fang-Hoover, J., Adler, B., Kauvar, L. M., Pereira, L. & Tabata, T. (2014). HCMV infection of human trophoblast progenitor cells of the placenta is neutralized by a human monoclonal antibody to glycoprotein B and not by antibodies to the pentamer complex. Viruses 6, 1346-1364, doi:10.3390/v6031346.
59 Macagno, A., Bernasconi, N. L., Vanzetta, F., Dander, E., Sarasini, A., Revello, M. G., Gerna, G., Sallusto, F. & Lanzavecchia, A. (2010). Isolation of human monoclonal antibodies that potently neutralize human cytomegalovirus infection by targeting different epitopes on the gH/gL/UL128-131A complex. J. Virol. 84, 1005-1013, doi:10.1128/JVI.01809-09.
60 Deng, R., Wang, Y., Maia, M., Burgess, T., McBride, J. M., Liao, X. C., Tavel, J. A. & Hanley, W. D. (2018). Pharmacokinetics and Exposure-Response Analysis of RG7667, a Combination of Two Anticytomegalovirus Monoclonal Antibodies, in a Phase 2a Randomized Trial To Prevent Cytomegalovirus Infection in High-Risk Kidney Transplant Recipients. Antimicrob. Agents Chemother. 62, doi:10.1128/AAC.01108-17.
61 Ishida, J. H., Burgess, T., Derby, M. A., Brown, P. A., Maia, M., Deng, R., Emu, B., Feierbach, B., Fouts, A. E., Liao, X. C. et al. (2015). Phase 1 Randomized, Double-Blind, Placebo-Controlled Study of RG7667, an Anticytomegalovirus Combination Monoclonal Antibody Therapy, in Healthy Adults. Antimicrob. Agents Chemother. 59, 4919-4929, doi:10.1128/AAC.00523-15.
62 Palmeira, P., Quinello, C., Silveira-Lessa, A. L., Zago, C. A. & Carneiro-Sampaio, M. (2012). IgG placental transfer in healthy and pathological pregnancies. Clin. Dev. Immunol. 2012, 985646, doi:10.1155/2012/985646.
63 Fox, E., Amaral, D. & Van de Water, J. (2012). Maternal and fetal antibrain antibodies in development and disease. Developmental neurobiology 72, 1327-1334, doi:10.1002/dneu.22052.
64 Saunders, N. R., Liddelow, S. A. & Dziegielewska, K. M. (2012). Barrier mechanisms in the developing brain. Frontiers in pharmacology 3, 46, doi:10.3389/fphar.2012.00046.
65 Maidji, E., McDonagh, S., Genbacev, O., Tabata, T. & Pereira, L. (2006). Maternal antibodies enhance or prevent cytomegalovirus infection in the placenta by neonatal Fc receptor-mediated transcytosis. Am. J. Pathol. 168, 1210-1226, doi:10.2353/ajpath.2006.050482.
66 Revello, M. G., Lazzarotto, T., Guerra, B., Spinillo, A., Ferrazzi, E., Kustermann, A., Guaschino, S., Vergani, P., Todros, T., Frusca, T. et al. (2014). A randomized trial of hyperimmune globulin to prevent congenital cytomegalovirus. N. Engl. J. Med. 370, 1316-1326, doi:10.1056/NEJMoa1310214.
67 Vanarsdall, A. L., Chin, A. L., Liu, J., Jardetzky, T. S., Mudd, J. O., Orloff, S. L., Streblow, D., Mussi-Pinhata, M. M., Yamamoto, A. Y., Duarte, G. et al. (2019). HCMV trimer- and pentamer-specific antibodies synergize for virus neutralization but do not correlate with congenital transmission. Proceedings of the National Academy of Sciences of the United States of America 116, 3728-3733, doi:10.1073/pnas.1814835116.
68 Nelson, C. S., Cruz, D. V., Tran, D., Bialas, K. M., Stamper, L., Wu, H., Gilbert, M., Blair, R., Alvarez, X., Itell, H. et al. (2017). Preexisting antibodies can protect against congenital cytomegalovirus infection in monkeys. JCI insight 2, doi:10.1172/jci.insight.94002.
69 Niwa, H., Yamamura, K. & Miyazaki, J. (1991). Efficient selection for high-expression transfectants with a novel eukaryotic vector. Gene 108, 193-199, doi:10.1016/0378-1119 (91) 90434-d.
70 Kime, C., Rand, T. A., Ivey, K. N., Srivastava, D., Yamanaka, S. & Tomoda, K. (2015). Practical Integration-Free Episomal Methods for Generating Human Induced Pluripotent Stem Cells. Curr Protoc Hum Genet 87, 21 22 21-21 22 21, doi:10.1002/0471142905.hg2102s87.
71 Li, L., Tian, E., Chen, X., Chao, J., Klein, J., Qu, Q., Sun, G., Sun, G., Huang, Y., Warden, C. D. et al. (2018). GFAP Mutations in Astrocytes Impair Oligodendrocyte Progenitor Proliferation and Myelination in an hiPSC Model of Alexander Disease. Cell stem cell 23, 239-251 e236, doi:10.1016/j.stem.2018.07.009.
72 Britt, W. J. (2010). Human cytomegalovirus: propagation, quantification, and storage. Curr. Protoc. Microbiol. Chapter 14, Unit 14E 13, doi:10.1002/9780471729259.mc14e03s18.
73 Andreoni, M., Faircloth, M., Vugler, L. & Britt, W. J. (1989). A rapid microneutralization assay for the measurement of neutralizing antibody reactive with human cytomegalovirus. J. Virol. Methods 23, 157-167.
74 Douvaras, P. & Fossati, V. (2015). Generation and isolation of oligodendrocyte progenitor cells from human pluripotent stem cells. Nature protocols 10, 1143-1154.
75 Kim, D., Pertea, G., Trapnell, C., Pimentel, H., Kelley, R. & Salzberg, S. L. (2013). TopHat2: accurate alignment of transcriptomes in the presence of insertions, deletions and gene fusions. Genome biology 14, R36, doi:10.1186/gb-2013-14-4-r36.

The invention claimed is:

1. An hiPSC-derived brain organoid comprising a layered structure which comprises (i) a core region positive for the neural progenitor markers SOX2 and TLX, and (ii) an outer layer positive for BRN2, a late-born superficial layer neuronal marker, and MAP2.

2. The brain organoid of claim 1, further comprising PAX6-positive apical progenitors, and TBR2-positive basal progenitors.

3. The brain organoid of claim 1, comprising SOX2-positive progenitors spanning across the ventricular zone and the subventricular zone.

4. The brain organoid of claim 1, wherein the brain organoid is SOX2+ in the ventricle zone, TBR2+ in the subventricular zone, and CTIP2+ in the cortical plate.

* * * * *

SEQUENCE LISTING

```
<160> NUMBER OF SEQ ID NOS: 12

<210> SEQ ID NO 1
<211> LENGTH: 19
<212> TYPE: RNA
<213> ORGANISM: Artificial Sequence
<220> FEATURE:
<223> OTHER INFORMATION: EGFR-siRNA sense strand

<400> SEQUENCE: 1
gacggcgucc gcaagugua                                                      19

<210> SEQ ID NO 2
<211> LENGTH: 21
<212> TYPE: RNA
<213> ORGANISM: Artificial Sequence
<220> FEATURE:
```

<223> OTHER INFORMATION: EGFR-siRNA antisense strand

<400> SEQUENCE: 2
uacacuugcg gacgccgucu u                                    21

<210> SEQ ID NO 3
<211> LENGTH: 19
<212> TYPE: RNA
<213> ORGANISM: Artificial Sequence
<220> FEATURE:
<223> OTHER INFORMATION: PDGFRalpha-specific siRNA sense strand

<400> SEQUENCE: 3
ccaccuucau caagagaga                                       19

<210> SEQ ID NO 4
<211> LENGTH: 21
<212> TYPE: RNA
<213> ORGANISM: Artificial Sequence
<220> FEATURE:
<223> OTHER INFORMATION: PDGFRalpha-specific siRNA antisense strand

<400> SEQUENCE: 4
ucucucuuga ugaaggugga a                                    21

<210> SEQ ID NO 5
<211> LENGTH: 19
<212> TYPE: RNA
<213> ORGANISM: Artificial Sequence
<220> FEATURE:
<223> OTHER INFORMATION: ITGA3-specific siRNA sense strand

<400> SEQUENCE: 5
gcuacaugau ucagcgcaa                                       19

<210> SEQ ID NO 6
<211> LENGTH: 21
<212> TYPE: RNA
<213> ORGANISM: Artificial Sequence
<220> FEATURE:
<223> OTHER INFORMATION: ITGA3-specific siRNA antisense strand

<400> SEQUENCE: 6
uugcgcugaa ucauguagcu g                                    21

<210> SEQ ID NO 7
<211> LENGTH: 19
<212> TYPE: RNA
<213> ORGANISM: Artificial Sequence
<220> FEATURE:
<223> OTHER INFORMATION: ITGA5-specific siRNA sense strand

<400> SEQUENCE: 7
gggaaccuca cuuacggcu                                       19

<210> SEQ ID NO 8
<211> LENGTH: 21
<212> TYPE: RNA
<213> ORGANISM: Artificial Sequence
<220> FEATURE:
<223> OTHER INFORMATION: ITGA5-specific siRNA antisense strand

<400> SEQUENCE: 8
agccguaagu gagguucccu u                                    21

```
<210> SEQ ID NO 9
<211> LENGTH: 19
<212> TYPE: RNA
<213> ORGANISM: Artificial Sequence
<220> FEATURE:
<223> OTHER INFORMATION: Integrin beta3 siRNA

<400> SEQUENCE: 9
ccagaugccu gcaccuuua                                                   19

<210> SEQ ID NO 10
<211> LENGTH: 16
<212> TYPE: RNA
<213> ORGANISM: Artificial Sequence
<220> FEATURE:
<223> OTHER INFORMATION: Integrin beta3 siRNA

<400> SEQUENCE: 10
gccaacccac uguaua                                                      16

<210> SEQ ID NO 11
<211> LENGTH: 19
<212> TYPE: RNA
<213> ORGANISM: Artificial Sequence
<220> FEATURE:
<223> OTHER INFORMATION: Integrin beta3 siRNA

<400> SEQUENCE: 11
gaagaacgcg ccagagcaa                                                   19

<210> SEQ ID NO 12
<211> LENGTH: 19
<212> TYPE: RNA
<213> ORGANISM: Artificial Sequence
<220> FEATURE:
<223> OTHER INFORMATION: Integrin beta3 siRNA

<400> SEQUENCE: 12
gcagugaauu guaccuaua                                                   19
```